United States Patent [19]

Clark et al.

[11] Patent Number: 5,584,932
[45] Date of Patent: Dec. 17, 1996

[54] ELECTRICAL CONTROL CIRCUIT FOR CONTROLLING THE SPEED AND POSITION OF A ROTARY SCREEN COATER WITH RESPECT TO THE LINE SPEED AND POSITION OF A MOVING WEB

[75] Inventors: Gregory F. Clark, Alpharetta; James G. Himes, Jr., Woodstock, both of Ga.

[73] Assignee: Nordson Corporation, Westlake, Ohio

[21] Appl. No.: 419,668

[22] Filed: Apr. 12, 1995

[51] Int. Cl.⁶ ................................................ B05C 1/00
[52] U.S. Cl. ................ 118/669; 118/674; 118/712; 118/203; 118/213; 118/244; 118/261; 118/406; 118/46; 156/350; 156/378; 156/578; 101/118; 101/120
[58] Field of Search .................................. 118/669, 674, 118/712, 203, 213, 244, 261, 406, 46; 156/350, 361, 363, 378, 387, 546, 578; 101/118, 120

[56] References Cited

U.S. PATENT DOCUMENTS

| | | | |
|---|---|---|---|
| 3,889,595 | 6/1975 | Jaffa | 101/118 |
| 3,978,787 | 9/1976 | Marino et al. | 101/115 |
| 4,627,345 | 12/1986 | Watts | 101/119 |
| 4,791,866 | 12/1988 | Kanno et al. | 101/118 |
| 5,213,033 | 5/1993 | Bourgeois et al. | 101/116 |
| 5,247,882 | 9/1993 | Zook et al. | 101/120 |
| 5,255,598 | 10/1993 | Van Sas et al. | 101/118 |
| 5,259,307 | 11/1993 | Bourgeois et al. | 101/118 |

OTHER PUBLICATIONS

M–Track User Manuel, Rev. B., Fenner Industrial Controls, "Section 6, Theory of Operation", pp. 6–1 through 6–6, copyright 1990.

Nordson Hot Melt Rotary Screen Printer Specification sheet, Mar. 1992.

*Primary Examiner*—Laura Edwards
*Attorney, Agent, or Firm*—Calfee Halter & Griswold

[57] ABSTRACT

A hot melt material coating system (10) is provided, comprising (i) a rotary coater (12) driven by a motor (604); (ii) a rotary coater position, speed and direction indicator (610) operatively connected to the rotary coater and providing a signal representing the position, speed and direction thereof; (iii) a web position, speed and direction indicator (612) operatively connected to the web and providing a signal representing the position, speed and direction thereof; and (iv) a control system (600). The control system (600) includes (a) a first control circuit (614) for receiving the rotary coater position, speed and direction indicator signal and the web position, speed and direction indicator signal, and for outputting a control signal to the motor in response to the indicator signals to maintain a predetermined relationship of the position, speed and direction of the rotary coater with respect to that of the web; (b) a web position indicator (618) positioned proximate to the web and providing a signal representing the position thereof with respect to the web; and (c) a second control circuit (616) for receiving the web position indicator signal and the web position, speed and direction indicator signal, and for outputting a web position correction signal to the first control circuit, the first control circuit varying the control signal in response to the web position correction signal.

17 Claims, 16 Drawing Sheets

ELECTRICAL CONTROL CIRCUIT FOR CONTROLLING THE SPEED AND POSITION OF A ROTARY SCREEN COATER WITH RESPECT TO THE LINE SPEED AND POSITION OF A MOVING WEB

RELATED APPLICATIONS

The following United States patent applications are incorporated herein by reference as if they had been fully set out:

Application Serial No. 08/421,413, filed Apr. 12, 1995, and entitled "Adjustable Rotary Coater Device for Applying Hot Melt Material to a Moving Web" (Further identified as Attorney Docket 11694-00115); and Application Serial No. 08/422,496, filed Apr. 12, 1995, and entitled "Adjustable Slot Coater Die for a Rotary Coater for Applying Hot Melt Matrial to a Moving Web" (Further identified as Attorney Docket 11694-00114).

TECHNICAL FIELD

The present invention relates generally to rotary screen coaters and more particularly to an electrical control circuit for controlling the speed, position and direction of a rotary screen coater with respect to the line speed and position of a moving web onto the surface of which the screen coater applies a hot melt adhesive coating.

BACKGROUND OF THE INVENTION

Control circuits are known for controlling and synchronizing an application process (e.g. cutting, sealing, perforating, printing) with respect to a moving web to which the application process is directed. One such application process involves the art of applying a hot melt material to a moving web, such as raw paper or label stock, using a hot melt material applicator such as a rotary screen coater. The Nordson rotary screen coater, manufactured by the assignee of the present invention, perform such a hot melt material application process.

To effectively perform such a process, a control circuit is required to correctly position the rotary applicator with respect to the moving web. The control circuit controls the speed of a slave process (such as the speed of a rotary applicator) based on a sensed speed of a master process (such as the speed of a web) and a selected relationship of desired slave speed with respect to master speed. Typically, motors are used to drive both the master process and slave process, and tachometers or encoders are mounted on each motor to provide an output signal representing the respective speeds of the master and slave processes.

A controller compares a reference signal (master tachometer or encoder output) with a fixed setpoint representing a desired slave/master speed ratio to determine an appropriate slave speed based on this comparison. The controller output is a control signal to the slave process motor which corresponds to the determined slave speed. This control signal output is altered in real time based on a feedback signal (slave tachometer or encoder output) which indicates the speed of the slave motor.

The foregoing description describes a typical closed loop control system for a master-slave process. Such a closed loop control system is usually an adequate means of synchronizing master and slave speeds to a desired speed relationship. However, such a system is not usually adequate if the position of a product, such as a web which is carried by a machine driven by the master process motor, must be precisely determined with respect to the slave process, such a rotary applicator. Such control is important, for example, if the web having hot melt material applied thereon is subject to later processing which depends on accurate positional coating of the web.

Because speed is a measurement of distance or position over time, merely controlling the speed of the web will not insure accurate positioning of the web over any predetermined short time interval. Moreover, should the position of the web become progressively improperly positioned with the rotary applicator during the process, a perfect unerring control of a desired speed slave-master speed ratio will serve only to maintain this positional error. This type of positional error typically "creeps" into the system over time as an accumulated error which grows during the course of the process.

Accordingly, if the position of a product, such as a web carried by a master process machine, must be precisely maintained with respect to the slave process, such a rotary applicator, auxiliary control means must be provided in addition to those recited above. One such auxiliary control means is provided by the M-Track motor speed controller, manufactured by Fenner/Comtrex Industrial Controls of Maple Grove, Minn. which provides an auxiliary input for a photosensor (photo eye) which reads photo registration marks (I-marks) on the web. The I-marks are positioned at regular intervals along the border of the web. The controller uses this auxiliary input for varying the controller output control signal.

Auxiliary control means such as that described above include a single control loop to compare the reference speed master signal, the fixed setpoint representing a desired slave/master speed ratio, the slave speed feedback signal, and the auxiliary photosensor web position input to arrive at an appropriate output control signal to the slave process motor. The reference speed master signal, the slave speed feedback signal, and the auxiliary photosensor signal are read in real time, thereby providing a current indication of the relative speeds of the master and slave processes and the position of the web. The fixed setpoint, however, merely represents a desired slave/master speed ratio which has been determined at the initialization of the process being controlled.

The single control loop output signal is determined by comparing the real time indications of the master and slave processes and the position of the web, with the desired setpoint speed ratio. If, over the course of time, the photosensor signal indicates that the positional error has gradually and continually increased ("creeped" into the system), each time the control loop reads the photosensor signal it must correct its output signal based on the positional error indicated by the photosensor signal. Positional errors cannot be eliminated without temporarily deviating from the desired setpoint speed ratio. The desired setpoint speed ratio, however, remains unchanged.

This operation results in control loop response times for resolving the positional error which grow along with the "creeping" accumulated positional error of the web. The greater the positional error indicated by the photosensor, the greater the correction factor the control loop must arrive at to match the speed ratio setpoint. The control loop is therefore fighting itself by recognizing a positional error and then correcting its output signal in a manner which may only serve to assure the continued, gradual increase of this error. In addition to increased response time, such operation may also result in eventual instability of the system.

It is an object of the invention therefore, to provide an improved electrical control circuit for controlling the position, speed and direction of a rotary screen coater with respect to the line position, speed and direction of a moving web, which prevents "creeping" positional errors of the web from being introduced into the system, and which provides a dynamic means of continually adjusting the position, speed and direction ratio setpoint to provide for better circuit response time.

SUMMARY OF THE PRESENT INVENTION

A control circuit for a hot melt material coating system is provided. The coating system includes a rotary coater attached to a web transport mechanism for transporting a web to be coated past the rotary coater.

The control circuit comprises a rotary coater position, speed and direction indicator operatively connected to the rotary coater motor and providing a signal representing the position, speed and direction thereof; and a web position, speed and direction indicator operatively connected to the web and providing a signal representing the position, speed and direction thereof. The rotary coater position, speed and direction indicator and the web position, speed and direction indicator are preferably digital quadrature encoders. A first portion of the control circuit receives the rotary coater position, speed and direction indicator signal and the web position, speed and direction indicator signal, and outputs a control signal to the motor in response to the indicator signals to maintain a predetermined relationship of the position, speed and direction of the rotary coater with respect to that of the web.

An input mechanism is provided for inputting to the first portion of the control circuit a setpoint value representing an initially calculated ratio of rotary coater dynamic position to web dynamic position. The input mechanism includes memory for transferring the setpoint value to the controller. The first control circuit initially outputs the control signal in response to the setpoint value.

A second portion of the control circuit comprises a web position indicator positioned proximate to the web and providing a signal representing the position thereof. The web position indicator is a photosensor for sensing defined positions on the web. A second control circuit receives the web position indicator signal and the web position, speed and direction indicator signal, and outputs a web position correction signal to the first control circuit. The first control circuit varies the control signal in response to the web position correction signal, which represents a setpoint value deviation. The second control circuit includes a counter for counting digital pulses output by the web position, speed and direction indicator, the counter being reset upon detection of successive defined positions on the web by the photosensor, and a co-processor for recalculating the setpoint deviation upon the occurrence of each of the detections.

DETAILED DESCRIPTION OF THE PREFERRED EMBODIMENT

Figure 1:
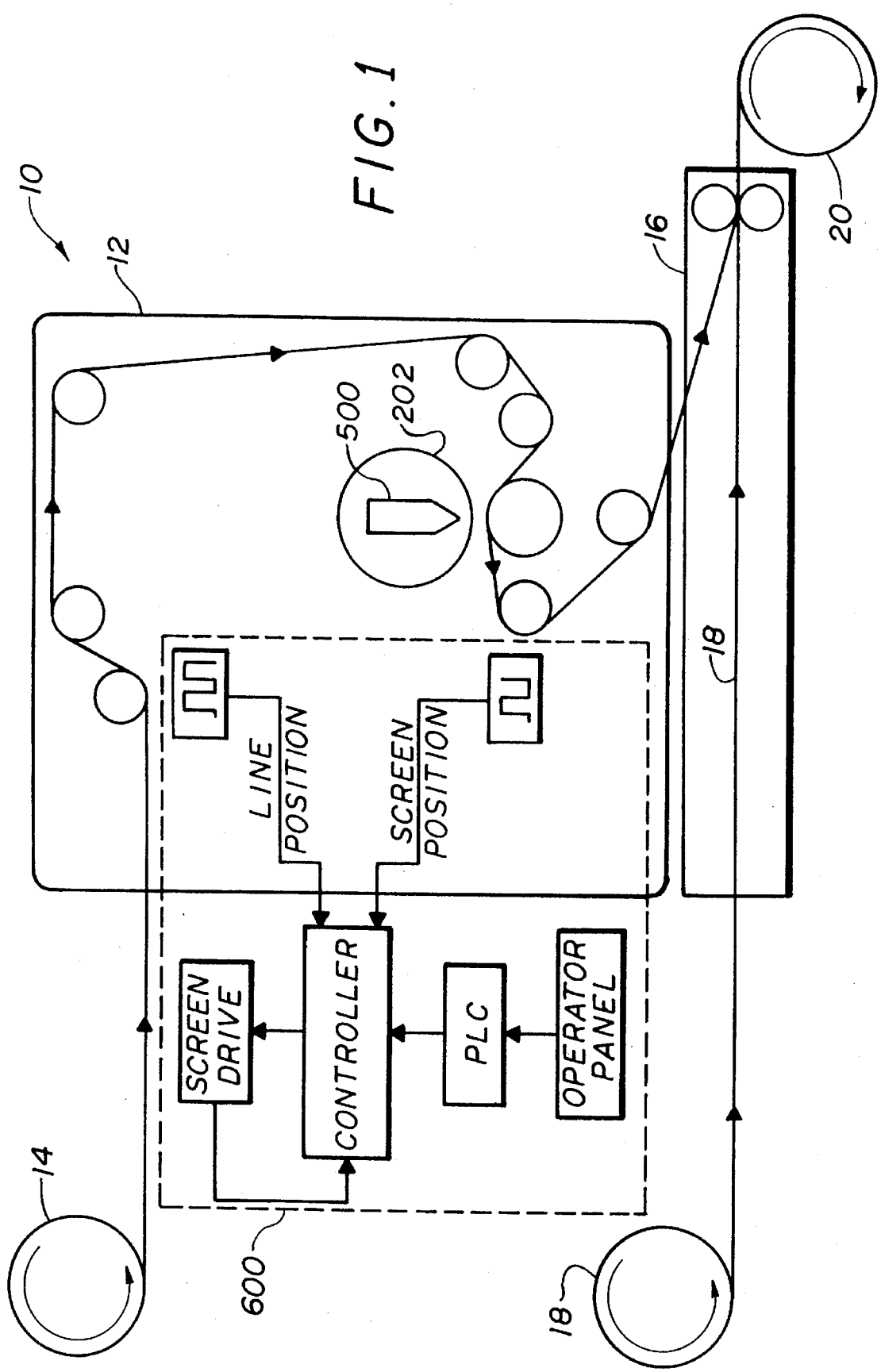
FIG. 1 is a schematic diagram showing a hot melt coating system constructed according to the principles of the present invention.

FIG. 1 shows one embodiment of a coating system 10 constructed according to the principles of the present invention. The system 10 includes a rotary screen coater 12 suitable for applying a hot melt material to a web 14. The term "hot melt material", as used broadly herein, is intended to include thermoplastic adhesives, thermoplastic resins, high performance adhesives, and other materials having a softening or melting point above 100 degrees F.

The system 10 as shown in FIG. 1 includes a nip 16 for compressing a laminate 18 against the side of the web 14 to which the hot melt material is applied. The resulting compressed sheet 20 is then rolled as a two-ply product. The invention as described herein, however, is not limited to applications involving a laminate or nip, and is appropriate for a variety of applications wherein at least one web is being coated with a hot melt material, with or without a laminate. If no laminate is applied, the coated web 14 in FIG. 1 would not pass through the nip 16.

Figure 16:
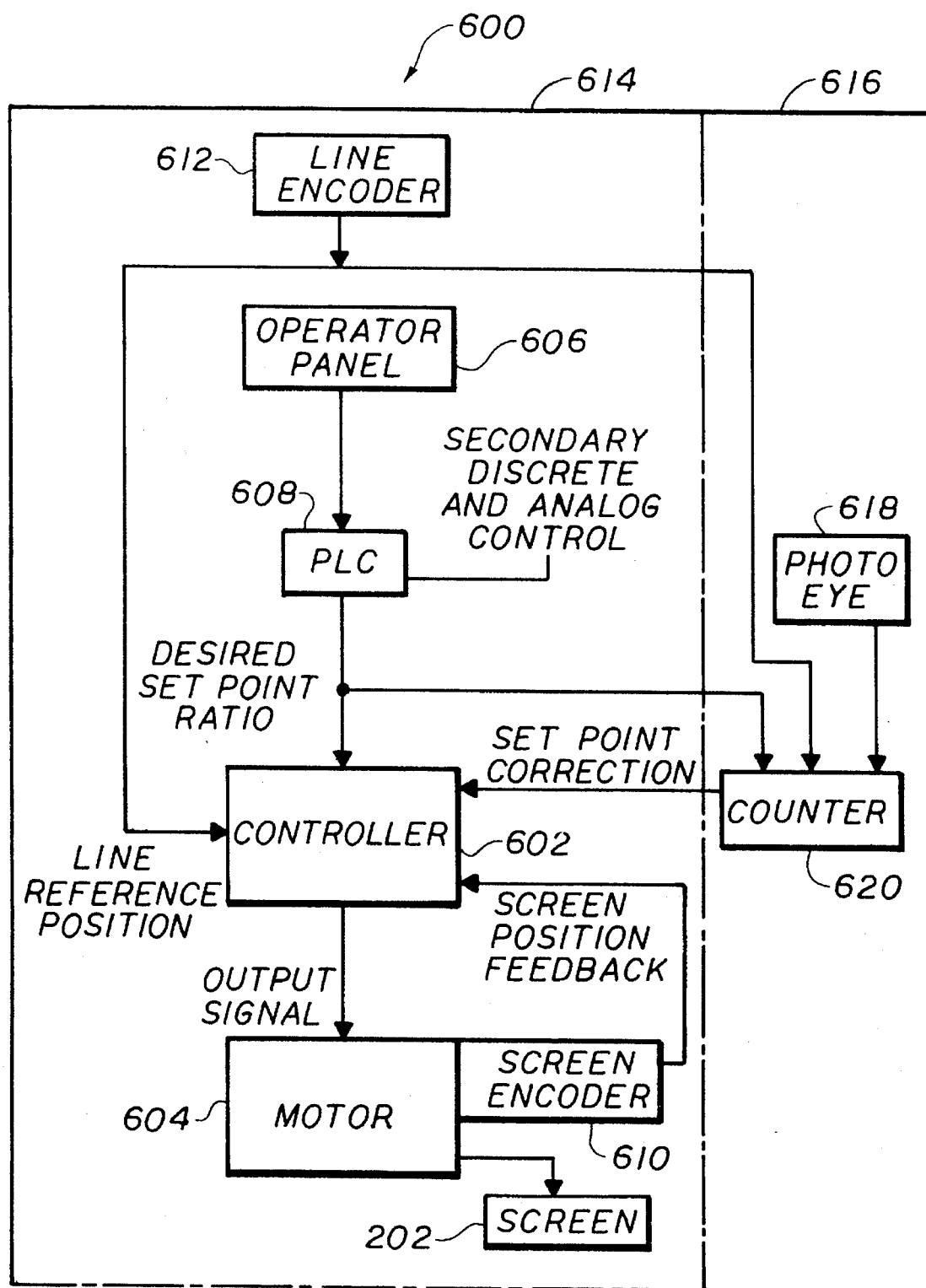

As shown in FIG. 1, the web 14 is transported through the rotary screen coater 12 and past a die 500 and a cylindrical screen 202 by a number of idler rolls (each of which is specifically described later herein). The web is driven at a line speed by an external motor (not shown). A control system 600 controls the speed and position of the screen 202 with respect to web 14 to insure precise application of a pattern of hot melt material onto the web. As will be described later with respect to the control system 600 and FIGS. 16–17, the system uses feedback elements to provide indications of line position, screen position, and web position error to precisely control the position of the screen with respect to the web.

Figure 2:
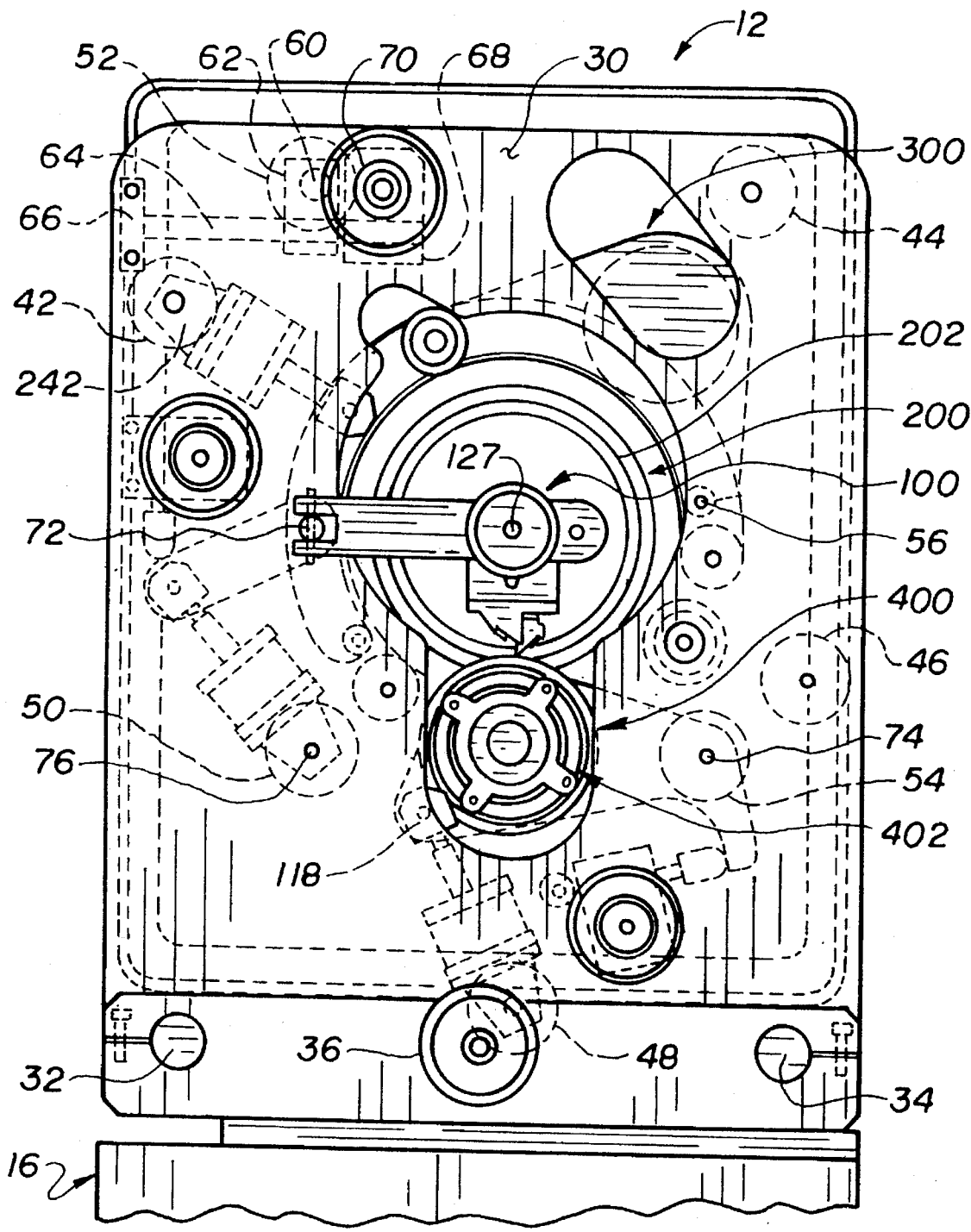
FIG. 2 is a front view of the rotary screen coater of the system of FIG. 1.

FIG. 2 shows a front view of the rotary screen coater 12 of FIG. 1 in more detail. The rotary screen coater 12 is built around a steel frame comprising front and rear frame plates 30 which are oriented in spaced apart parallel relationship to each other. As used herein, "front" shall mean the side of the rotary screen coater shown in FIG. 2, "rear" shall mean the side opposite the front, and "top" and "bottom" shall correspond to the top and bottom of FIG. 2, respectively. The distance separating the spaced apart plates 30 generally corresponds to the width of the web being coated and of the various assemblies which together make the rotary screen coater 12 (see FIGS. 3–9).

The front and rear frame plates 30 are mounted at their respective bases to steel shafts 32, 34 as is known in the art. The coater centerline is adjustable for alignment with the web 14 by adjusting a cross-web adjusting wheel 36. Rotation of the wheel 36 in one direction draws the coater toward one edge of the web, and rotation in the other direction forces the coater to the opposite edge of the web.

As explained in further detail below, the rotary screen coater 12 comprises a number of assemblies through which pass the web 14 which is to be coated. Each of the assemblies are mounted on either end to the front and rear frame plates 30. These assemblies include a die bracket assembly 100, a screen assembly 200 (including cylindrical screen 202), a heater hood assembly 300, and an impression roll assembly 400 (including impression roll 402) (also see FIGS. 3–9).

In addition to these assemblies, the rotary screen coater 12 includes a number of idler rolls which guide the web to be coated through these various assemblies. These idler rolls include rolls 42, 44, 46, 48, 50 and 54, which are free to rotate about an axis which is fixed with respect to the frame plates, and roll 52 which is free to rotate about an axis which is movable with respect to the frame plates. Roll 50 is coated with silicon rubber to prevent slippage between the web and the roll surface. A screen eject pivot rod 56 is also provided, the purpose of which is more fully described with respect to the screen assembly 200.

The path which the web 14 follows through the rotary screen coater depends on the side of the web to be coated. A first direction of travel of the web through the rotary screen coater is shown in FIG. 1. Here, the web enters the top of the rotary screen coater at idler roll 42. An opposite side of coating of the web is possible if the web enters the bottom of the rotary screen coater 12 from the left of idler roll 48, around this roll and over the left and top of idler roll 50 past the die 500, and out of the rotary screen coater over the top of idler roll 54. If no laminate is to be applied to the coated web, the coated web does not pass through a nip. If, however, a laminate were to be applied to the coated web passing through the coater in this direction, the laminate could pass through idler rolls 42, 52, and 44 (similar to the path that web 14 takes in FIG. 1) and on to the nip 16.

The idler roll 52 is referred to as a phase adjust roll because the position of a web passing thereover may be adjusted with respect to the position of a laminate at the nip 16 by adjusting the position of roll 52. Adjusting the position of roll 52 (left to right in FIG. 2) either lengthens or shortens the distance that the web 14 must cover when passing through the rotary screen coater 12. In this manner, the positions of the web and laminate may be fixed in phase, that is, in a desired positional relationship with one another at the nip 16.

FIG. 2 shows the means which are implemented to permit such phase adjustment of the web and laminate. At both the front and rear ends of the frame, a shaft 60 running the cross-web width of the idler roll 52 is attached to blocks 62 which move along threaded rod 64. The rods are connected at their left ends to the frame plates 30 by mountings 66, and at their right ends to worm gear assemblies 68 which are also fixedly mounted to the frame plates. By rotating wheel 70 on the front of the rotary screen coater 12, both the front and rear worm gear assemblies are actuated, thereby rotating the threaded rods 64 which move the blocks 62, and hence the idler roll 52 attached thereto, longitudinally along the rods 64.

The remaining assemblies which make up the rotary screen coater 12 are discussed in greater detail below (i.e. the die bracket assembly 100, the screen assembly 200, the heater hood assembly 300, and the impression roll assembly 400), all of which are pivotally movable within the rotary screen coater. With reference to FIG. 2, the die bracket assembly 100, the screen assembly 200 and the heater hood assembly 300 pivot about axis 72, and the impression roll assembly pivots about axis 74.

The Die Bracket Assembly 100

Figure 3:
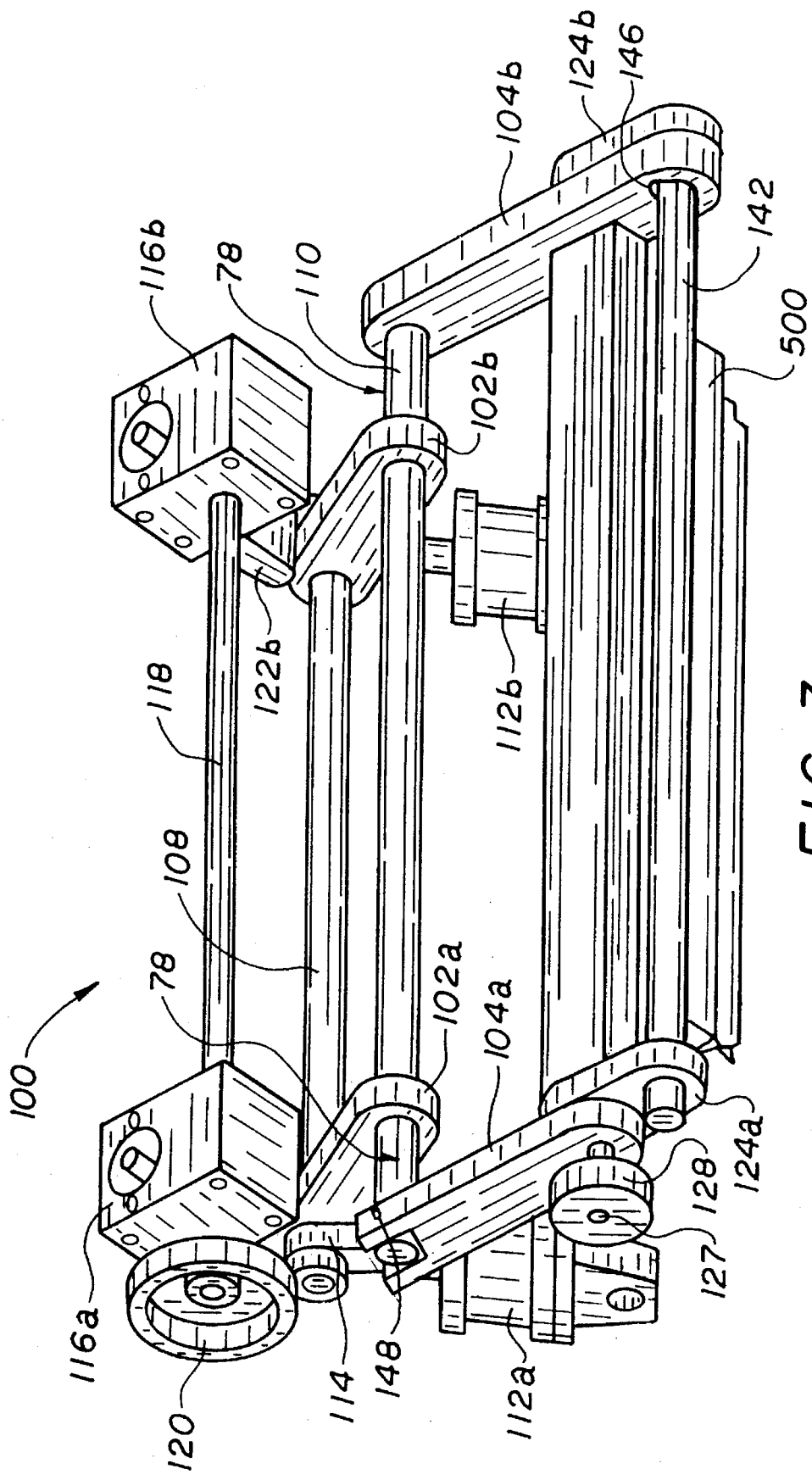
FIG. 3 is a perspective view of the die bracket assembly of the rotary screen coater of FIG. 2.

A perspective view of the die bracket assembly 100 is shown in FIG. 3. The die bracket assembly 100 includes outer support arms 102a and 102b and inner support arms 104a and 104b for supporting a die 500. With respect to FIG. 2, the arms 102a and 104a are located at the front of the rotary screen coater 12, and arms 102b and 104b are located at the rear. The die bracket assembly 100 also includes pneumatically operated means for lowering and raising the die 500 into and out of its coating position with respect to an inner surface of cylindrical screen 202, and mechanically operated means for finely adjusting the position of the die at its front and rear ends with respect to the inner surface of the screen.

The outer support arms 102a and 102b are fixedly attached at their outer ends to a rigid shaft 108. The inner ends of the outer support arms (opposite the outer ends) are also fixedly connected by rigid shaft 110. Shaft 110 extends beyond the outer support arms, and through the front and rear frame plates, to also fixedly attach to the outer ends of the inner support arms 104a and 104b. The locations 78 on the shaft 110 correspond to the location of the front and rear frame plates 30. The shaft 110 corresponds to the pivot axis 72 (FIG. 2) about which the die bracket assembly 100 pivots within the rotary screen coater 12. As further explained below with respect to FIG. 4, the die 500 is adjustably attached between the inner ends of the inner support arms 104a, 104b.

The means for lowering and raising the die 500 into and out of its coating position comprises a pair or actuation cylinders (actuators) 112a and 112b. The actuators 112a, 112b, like all actuators described herein, are pneumatically operated cylinders, although it is contemplated that hydraulic cylinders and electromechanical devices may also be suitable for use with the present invention. The inextensible ends of the actuators 112 are mounted to the front and rear frame plates at location 76, concentric with idler roll 50 (see FIG. 2). The extensible ends (pistons) of the actuators are mounted to the outer support arms using a clevis 114. As shown in FIG. 3, the pistons of actuators 112a and 112b are extended and the die 500 is in its lowered, or coating, position (also see FIG. 10).

Figure 10:
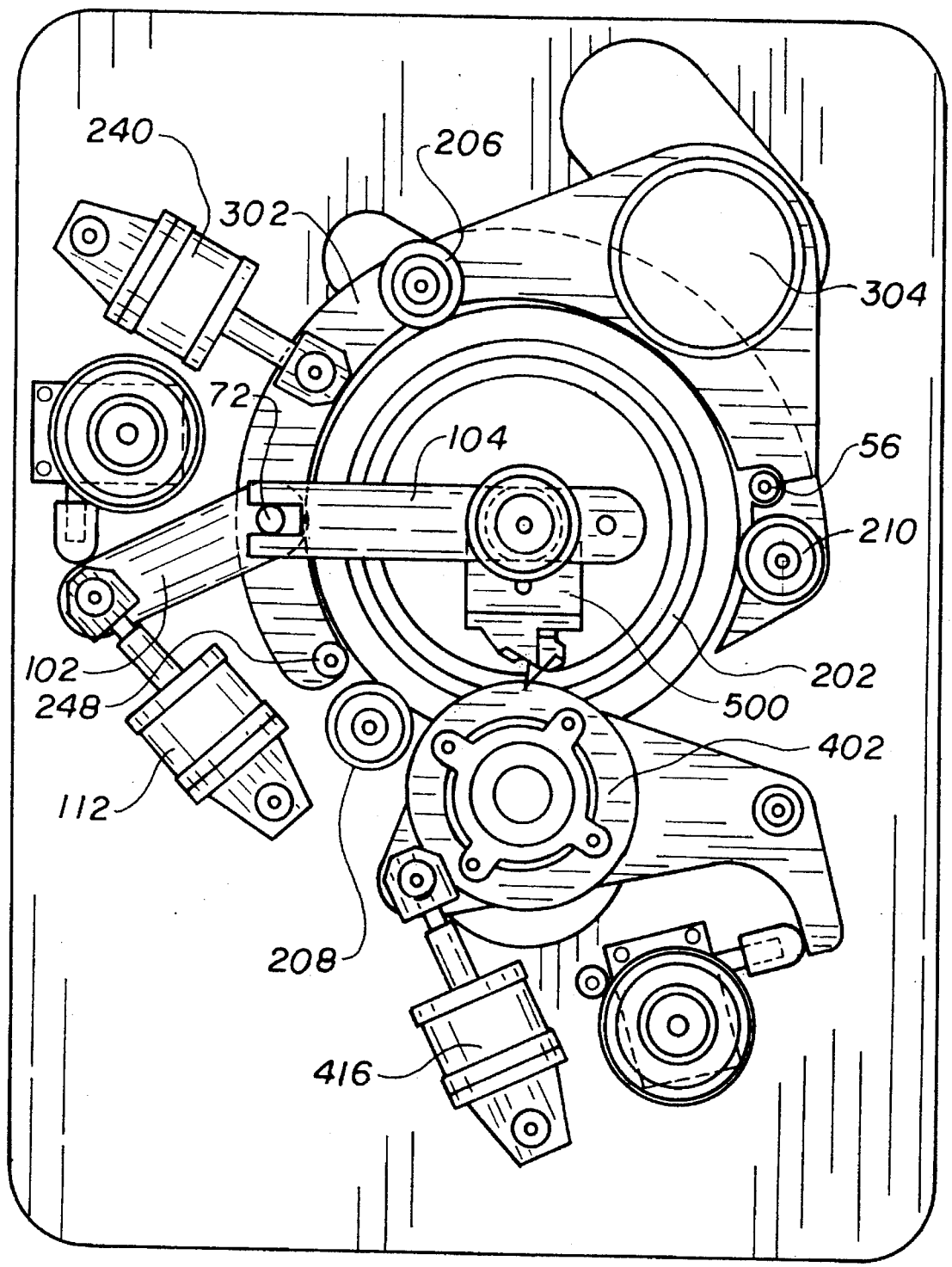
FIGS. 10–12 are simplified front views of the screen coater of FIG. 2 in various states of operation.
Figure 11:
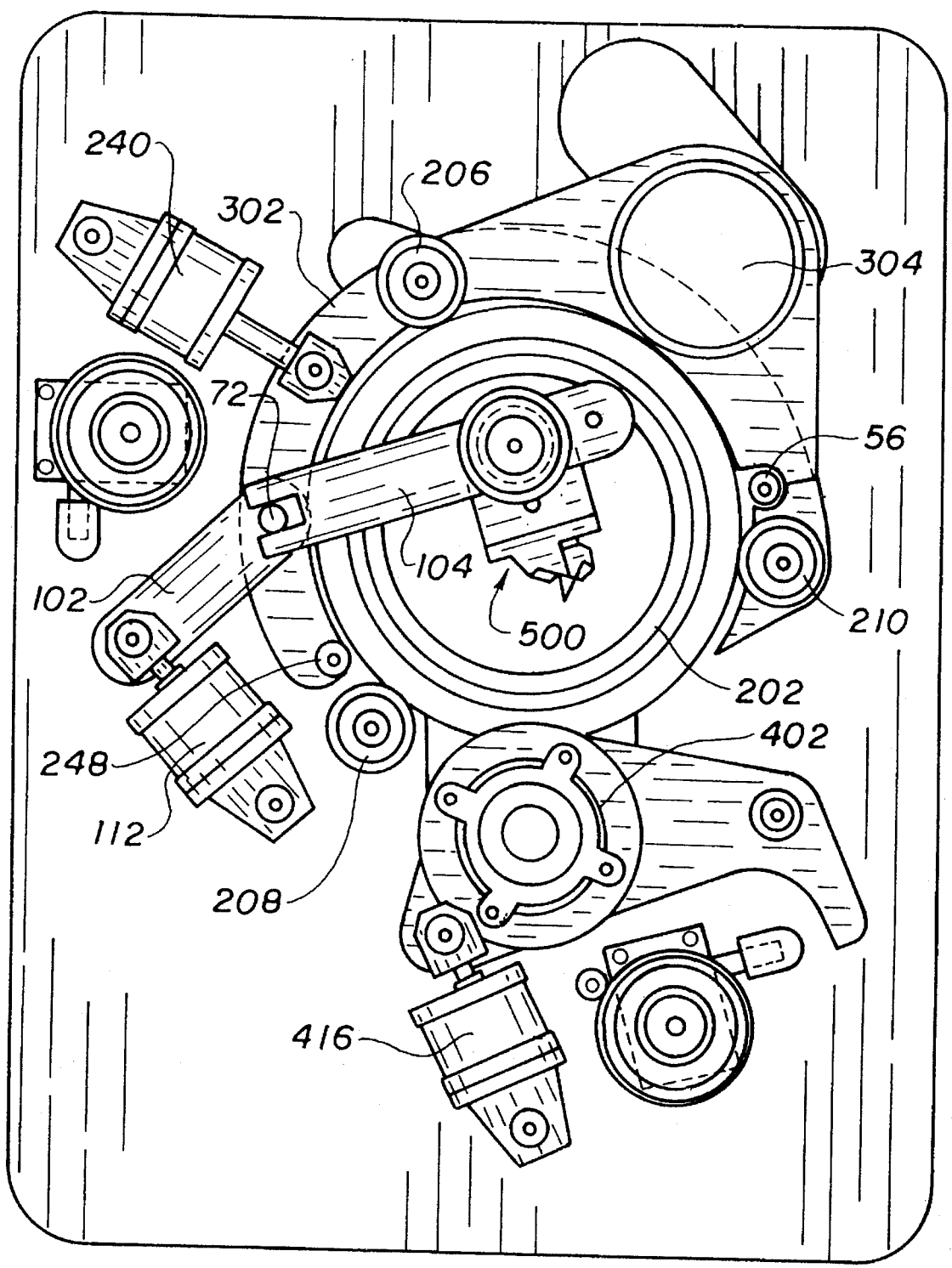
Figure 12:
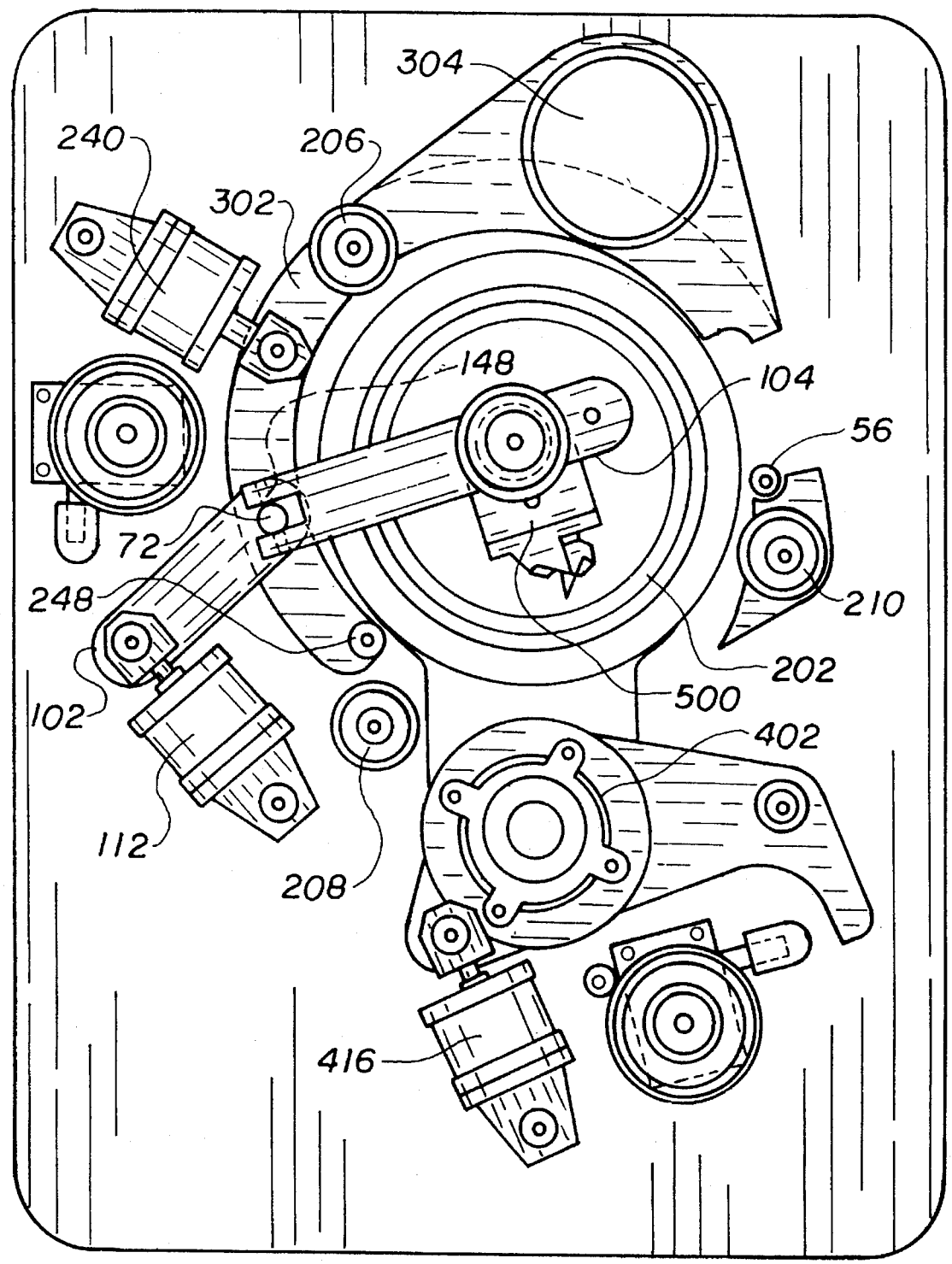

Because the outer support arms 102a and 102b are fixedly attached to the inner support arms 104a and 104b by shaft 110, and the die 500 is attached to the inner support arms, lowering the outer support arms by retracting the pistons on the actuators 112 pivots the outer-inner support arm and die combination about shaft 110 to raise the die 500 from its position near the inner surface of the screen 202 (see FIGS. 11–12). This operation is required to prevent hot melt material from being forced through the screen 202 when the rotary screen coater 12 is in standby mode (hot melt material not being pumped to the die). Alternatively, raising the outer support arms by extending the pistons on the actuators 112 pivots this combination in the other direction to lower the die into its operable, or coating, position near the inner surface of the screen (see FIG. 10).

The means for finely adjusting the position of the die at its front and rear ends with respect to the inner surface of the screen 202 comprises front and rear worm gear assemblies 116*a* and 116*b* which are connected to each other by a split coupled shaft 118. Like the actuators 112, these worm gear assemblies are fixedly attached to the front and rear frame plates 30. An adjustment wheel 120 attached to the shaft 118 extends outside of the front frame plate 30 to actuate both the front and rear worm gear assemblies 116*a*, 116*b*. Blocks 122*a* (not shown) and 122*b* extending below the worm gear assemblies are raised and lowered in response to actuation of the front and rear worm gear assemblies by rotation of the adjustment wheel 120.

When the die is in its lowered operating position, the actuators 112 in their extended position force the outer ends of the outer support arms into contact with the blocks 122. Accordingly, by merely turning the adjustment wheel 120 to actuate both worm gear assemblies, the blocks 122 are raised in lowered, thereby minutely lowering and raising the die 500, respectively.

Because the die must be positioned accurately with respect to the inner surface of the screen 202 to assure even distribution of hot melt material across the inner surface of the screen, the die bracket assembly 100 provides means for independently adjusting the position of the die with respect to the inner surface of the screen at both the front end and the rear end of the die. By disconnecting a split coupling (not shown in FIG. 3) in the middle of the shaft 118 which couples/uncouples front and rear halves of the shaft, the front worm gear assembly 116*a* may act independently of the rear worm gear assembly 116*b*. Accordingly, with the shaft halves coupled, the wheel 120 may be rotated to fine tune the position of the rear end of the die with respect to the inner surface of the screen. Then, by decoupling the shaft halves, the front worm gear assembly 116*a* may be operated independently of the rear gear assembly 116*b* to fine tune the position of the front end of the die with respect to the inner surface of the screen. In this manner, the position of the die 500 may be adjusted with respect to the inner surface of the screen 202 across the entire cross-web width of the die.

Figure 4:
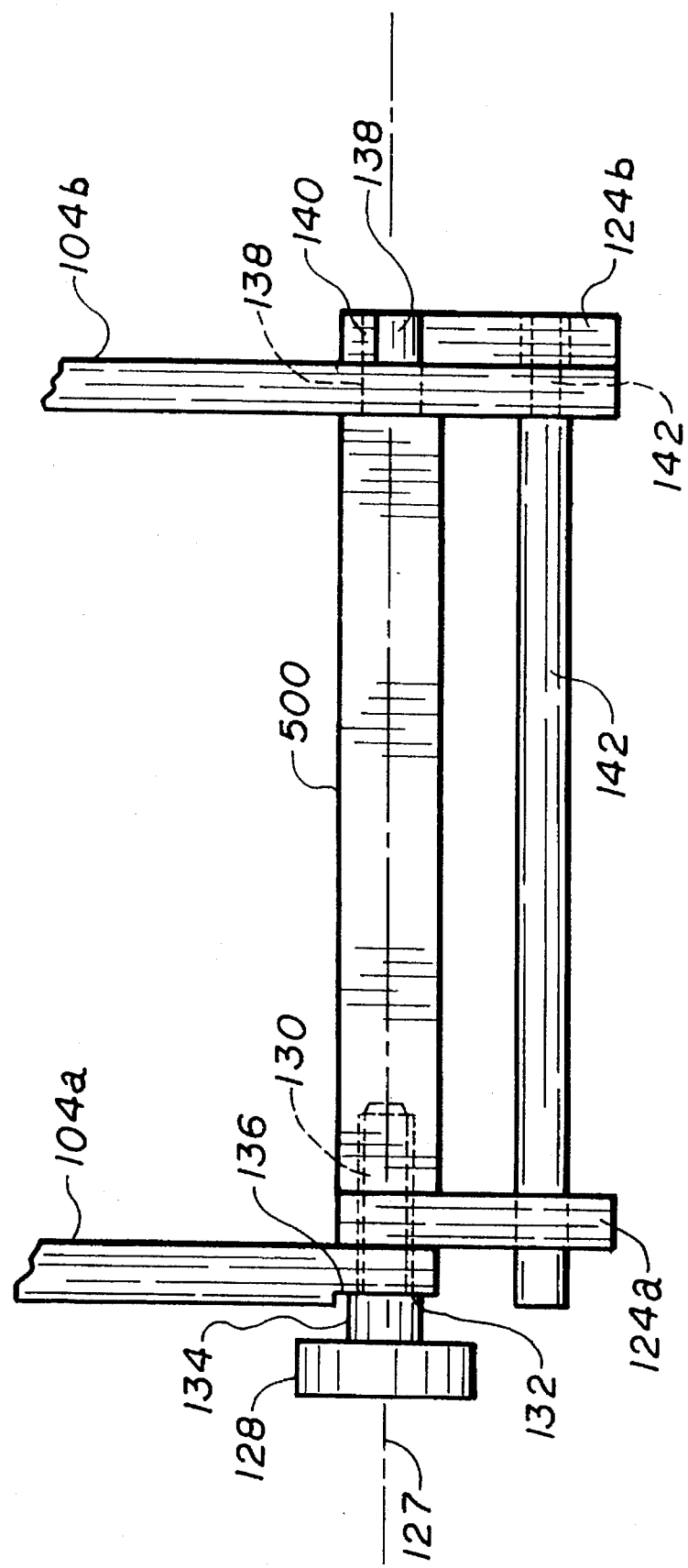
FIG. 4 is a top view of the die mounting mechanism of the die bracket assembly of FIG. 3.

As mentioned above, the die 500 is adjustably attached between the inner ends of the inner support arms 104*a*, 104*b*. Die pivot arms 124*a* and 124*b* at these ends enable the die 500 to pivot about an axis 127, which corresponds to the longitudinal axis of cylindrical screen 202. The die 500 is mounted to the inner support arms 104*a*, 104*b* and their corresponding pivot arms 124*a*, 124*b* as shown in FIG. 4.

A knob 128 having a threaded shaft 130 screws into the front end of the die 500 through the front inner support arm 104*a* and the front pivot arm 124*a*. A flange 132 on a non-threaded portion 134 of the knob shaft abuts a recess 136 in the front inner support arm 104*a* so that when the knob is tightened, the front end of the die 500, the front pivot arm 124*a*, and the front inner support arm 104*a* are fixedly secured together. Although not shown in FIG. 4, a bushing or bearing may be installed surrounding the portion of the shaft 134 within the front pivot arm and the front inner support arm to facilitate rotation therein.

The rear end of the die 500 is secured within the die bracket assembly 100 as follows. A shaft 138 extending from the die passes through the rear inner support arm and is keyed into a fixed position within and with respect to the rear pivot arm 124*b* by a key 140. Like the front end of the die, a bushing or bearing may be installed surrounding the shaft 138 within the rear inner support arm 104*b*, so that the die 500 and rear pivot arm 124*b* may freely rotate as a unit with respect to the rear inner support arm.

The rear end of the die 500 is fixed in position with respect to the rear inner support arm 104*b* by means of a shaft 142 which fits through the front pivot arm 124*a* and the rear inner support arm 104*b* and screws into the rear pivot arm 124*b*. The shaft 142 may freely rotate within front pivot arm 124*a*. Although not shown in FIG. 4, a handle may be attached to the front end of the shaft 142 to enable the shaft to be screwed into and out of the rear pivot arm 124*b*. When tightened, a flange 144 on the shaft 142 abuts the rear inner support arm to clamp the rear inner support arm 104*b* between the flange and the rear pivot arm 124*b*.

The above-described configuration of the front and rear inner support arms 104*a*, 104*b*, the front and rear pivot arms 124*a*, 124*b*, and the threaded shafts 134 and 142 permit limited movement of the die 500 along a small arc within the inner surface of the cylindrical screen 202, corresponding to a moving radius of the cylindrical screen. At a midpoint position of this arc, the die is positioned proximate the point at which the screen 202 meets the impression roll 402 (see FIG. 2). Typically, however, it is desirable for the die to be deliberately mispositioned in front of this point (i.e. to "lead" the web as it passes through the point of tangency of the impression roll and the screen). The die is pivotable in both directions from this midpoint position to accommodate opposite directions of travel of the web.

The proper lead or lag position of the die is obtained by first loosening knob 128 and the shaft 142 so that the die may freely pivot about shaft 134 (axis 127). On the front end of the die, the front pivot arm 124*a* may pivot freely about axis 127. On the rear end of the die, however, an arc-shaped oval 146 (see FIG. 3) must be provided in the rear inner support arm 104*b* so that the die 500 and rear pivot arm 124*b* may pivot about axis 127. With the knob 128 and the shaft 142 loosened, the die 500 may be positioned properly within its arc of movement. After being properly positioned, the knob 128 and the shaft 142 may be tightened, respectively, to fix the front and rear ends of the die in this desired position.

Also as shown in FIG. 3, the front inner support arm 104*a* is pivotally mounted at its outer end to the shaft 110 by a pin 148. As explained immediately below with respect to the screen assembly 200, when the knob 128 is loosened, the inner support arm 104*a* can pivot about pin 148 away from the front frame plate to permit the screen 202 to be removed from the rotary screen coater 12.

The Screen Assembly 200

Figure 5:
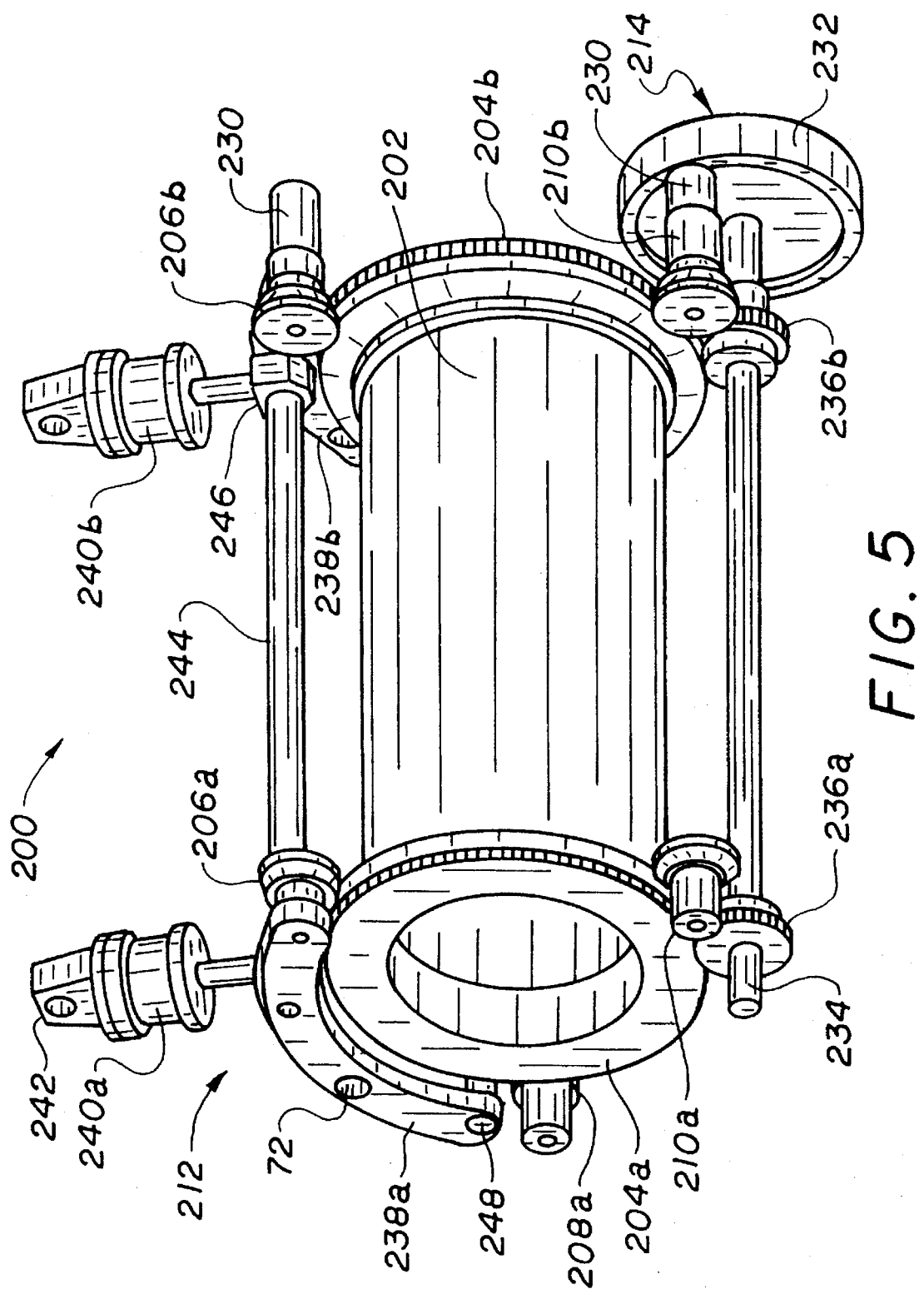
FIG. 5 is a perspective view of the screen assembly of the rotary screen coater of FIG. 2.

As shown in FIG. 5, the screen assembly 200 includes the cylindrical screen 202 which is supported by front and rear end rings 204*a*, 204*b*. The end rings in turn are supported by three front guide wheels 206*a*, 208*a* and 210*a* and three rear guide wheels 206*b*, 208*b* (not shown) and 210*b*. The guide wheels are positioned approximately 120 degrees apart about the circumference of the end rings. Guide wheels 208*a–b* and 210*a–b* are fixedly attached to the front and rear frame plates so as to provide rigid support for the end rings 204 and the screen 202 supported thereon. The screen assembly 200 also includes means 212 for pivoting guide wheels 206*a–b* outwardly so as to permit removal of the screen 202 for replacement or maintenance. In addition, a drive assembly 214 is provided for positively driving the end rings 204, and thus the screen 202.

Figure 6:
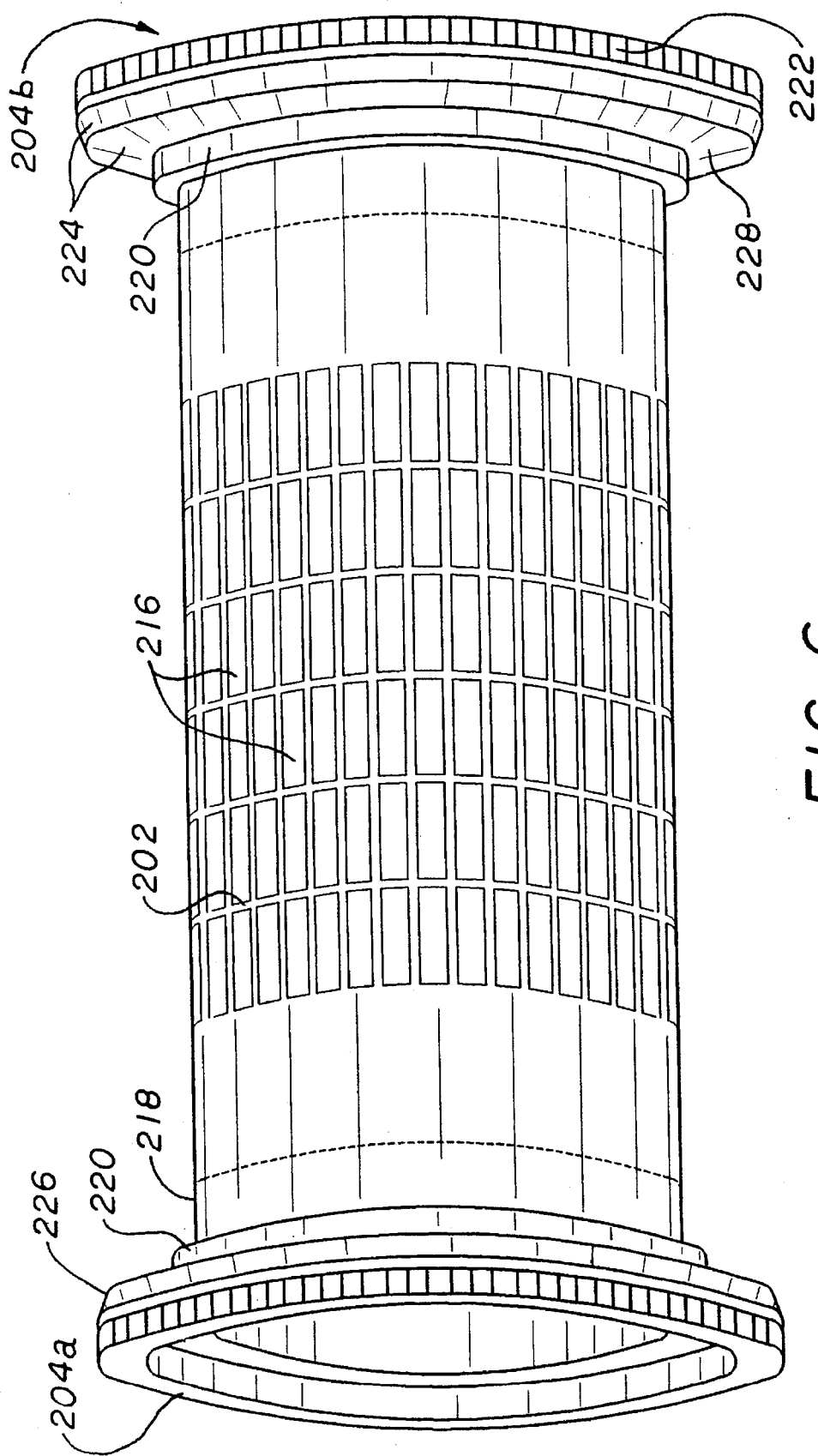
FIG. 6 is a perspective view of the screen of the screen assembly of FIG. 5.

The screen 202 and end rings 204 are shown in more detail in FIG. 6. The screen 202 is preferably comprised of a thin sheet of nickel-alloy mesh formed in the shape of an open ended cylinder, which is preferably seamless about its perimeter. Other materials suitable for constructing the screen are steel, titanium, or synthetic materials. A pattern of openings 216 are formed in the screen 202, through which hot melt material may flow, by known photo plating and thin film metal deposition processes.

The cylindrical shape of the screen is supported at its front and rear ends by cylindrical portions 218 of the rigid end rings having a diameter corresponding to that of the cylindrical screen. The front and rear ends of the screen are slipped over these portions and secured thereto by clamps 220. Each of the end rings also provides a circumferential gear 222 and an angled support surface 224 upon which the guide wheels roll. The angled support surface 224 comprises a flat circumferential surface 226 and a sharply tapered (at about 80 degrees) surface 228. The teeth on the circumferential gears 222 are cut into the circumferential gear so that the top of the gear teeth do not extend beyond the flat circumferential surface 226. Such a design prevents damage to the teeth during handling when the screen 202 is removed from the rotary screen coater 12.

The wheels have an internal end ring-mating surface which matches that of the angled support surface 224. Accordingly, the internal end ring-mating surface corresponding to the flat circumferential surface 226 maintains the radial position of the screen 202 about axis 127, and the internal end ring-mating surface corresponding to the sharply tapered surface 228 maintains the longitudinal position of the screen along this axis. The rear guide wheels located at the rear of the screen (206b, 208b, 210b) are provided with pneumatically operated actuation cylinders 230 which retract these wheels toward the rear of the rotary screen coater 12. Because the internal end ring-mating surface of each of the guide wheels abuts the sharply tapered surface 228 of the end rings, retraction of the rear guide wheels applies a tension across the width of the screen. This constant tension prevents the screen from collapsing, accommodates any longitudinal growth of the screen across its width as it experiences thermal expansion during normal operations, and compensates for any misalignment of the front and rear end rings.

Referring back to FIG. 5, the drive assembly 214 comprises a timing belt (pulley) 232 connected to a drive shaft 234, and a pair of drive gears 236a, 236b. An electrical servomotor (see FIG. 16) drives the timing belt 232. Teeth on the drive gears 236a, 236b match those on the end rings 204a, 204b. The rear drive gear 236b is fixedly attached to the drive shaft 234. The front drive gear 236a, however, may be loosened to rotate freely about the drive shaft 234 so that it may be properly matched with the teeth in the front end ring 204a once the rear drive gear is matched with the rear end ring 204b. The front drive gear 236a may then be tightened to fix its position with respect to the drive shaft 234.

The means 212 for pivoting guide wheels 206a–b outwardly to permit removal of the screen 202 from the rotary screen coater 12 comprises a pair of retractable arms 238a, 238b which are retracted by actuators 240a, 240b to pivot about shaft 110 (axis 72). The inextensible ends of each of the actuators 240 are mounted to the front and rear frame plates at location 242, concentric with idler roll 42 (see FIG. 2). The extensible ends (pistons) of each of the actuators 240 are mounted to a rigid support bar 244 by clevises 246. As shown in FIG. 5, the pistons on actuators 240 are extended and the screen is in its operating position (also see FIGS. 10 and 11). In this operating position, the front inner die support arm 104a is positioned as shown in FIG. 3, with the knob 128 screwed into the die 500.

When it is desired to remove the screen 202 from the rotary screen coater 12, the knob 128 is loosened and the front inner die support arm 104a is swung away from the die and the screen about pin 148 (refer back to FIG. 3). The pistons on the actuators 240 are then retracted, so that the top portions of the retractable arms along with guide wheels 206a, 206b are drawn outwardly as the arms pivot about axis 72. A screen ejection rod 248 connecting the bottom portions of the retractable arms moves in an opposite direction, inwardly, thereby pushing the end rings 204 against the fixed position screen eject pivot rod 56 (FIG. 2) to dislodge the screen from its operating position to a non-operating position parallel to and displaced from the axis 127 (also see FIG. 12).

The Heater Hood Assembly 300

Figure 7:
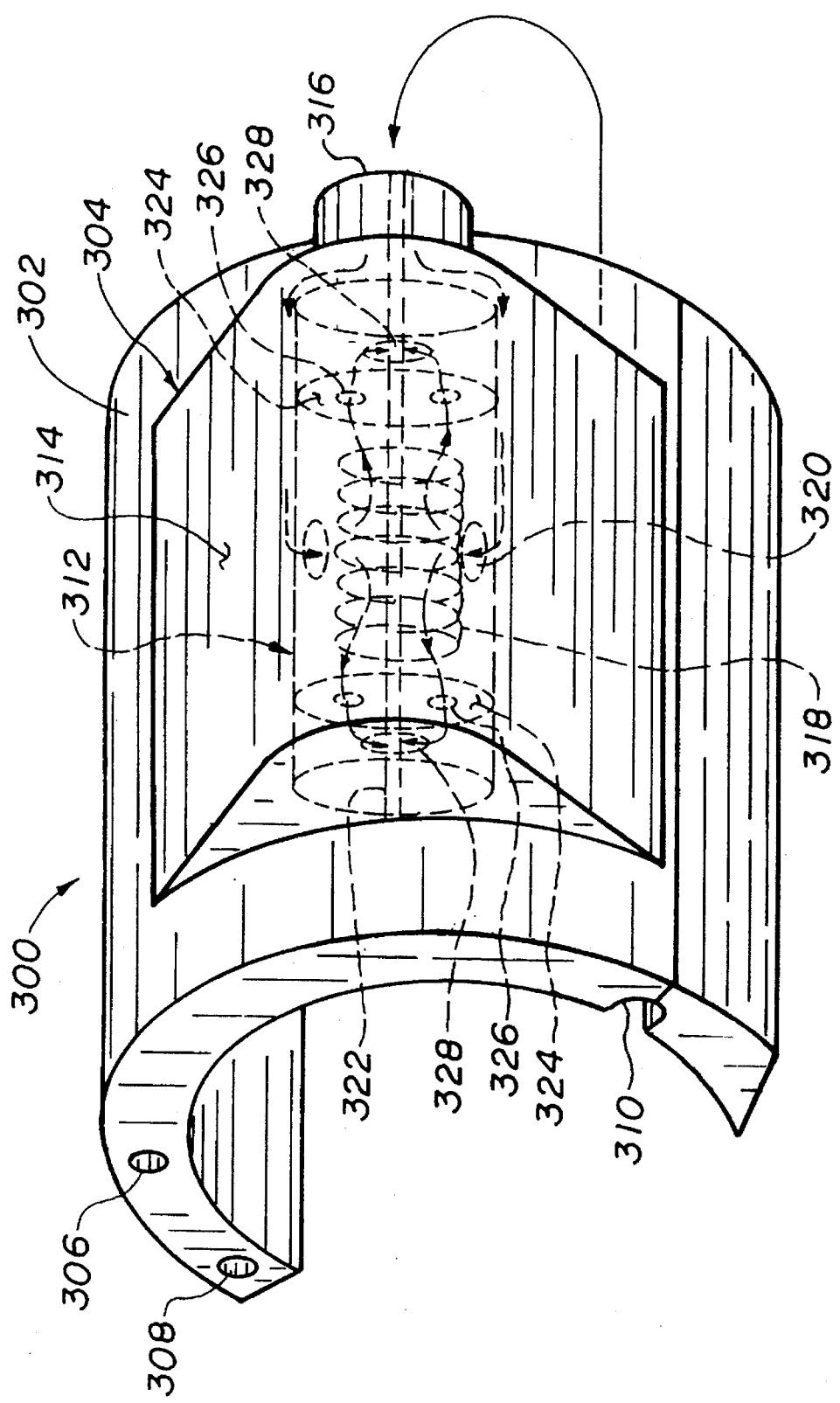
FIG. 7 is a perspective view of the heater hood assembly of the rotary screen coater of FIG. 2.

The present invention also provides means for evenly heating the surface of the screen 202 to insure the uniform flow of hot melt material passing through it. As shown in FIG. 7, the heater hood assembly includes a semicylindrical shroud or hood 302 and a heater assembly 304 attached thereto. The heater hood assembly assures even heating of the outer surface of the screen 202.

The hood 302 is mounted at holes 306 directly to the rigid support bar 244 of the screen assembly 200 (FIG. 5) and at holes 308 to shaft 110 of the die bracket assembly 100 (FIG. 3). Accordingly, the heater hood assembly 300 pivots about shaft 110 (axis 72) along with the retractable arms 238 of the screen assembly 200 when the pistons on actuators 240 are retracted (see FIG. 12). A notch 310 is provided for the hood 302 to rest upon the screen eject guide rod 56 (FIG. 2) when the rotary screen coater is in its operating condition.

The heater assembly 304 comprises a heater housing 312 surrounded by an enclosure 314. Air is recirculated in a path shown by the arrows from a position above the hood 302 within the rotary screen coater by a blower (not shown) to an inlet 316 in the enclosure 314. The recirculated air passes over the surface of the housing 312, through the space between the housing and the enclosure 314, and enters a central portion of the housing containing a heater element 318 through housing openings 320. The heater element is supported by a support rod 322 and is electrically energized to heat the recirculated air.

End portions of the housing 312 are formed by metal walls (discs) 324 disposed at both ends of the heater element 318. The air heated by the heater element moves from the central portion of the housing to the end portions through openings (apertures) 326 in the discs 324. The heated air is mixed in the end portions of the housing and leaves the housing through openings 328 at the bottom of the housing which direct the heated air through a corresponding opening(s) in the heater hood 302 toward the cylindrical screen 202. The heated air exiting these openings heats the cylindrical screen 202 near its ends, at which locations the screen cools the quickest. The above-described heating system assures an evenly heated screen across its entire cylindrical surface.

Figure 8:
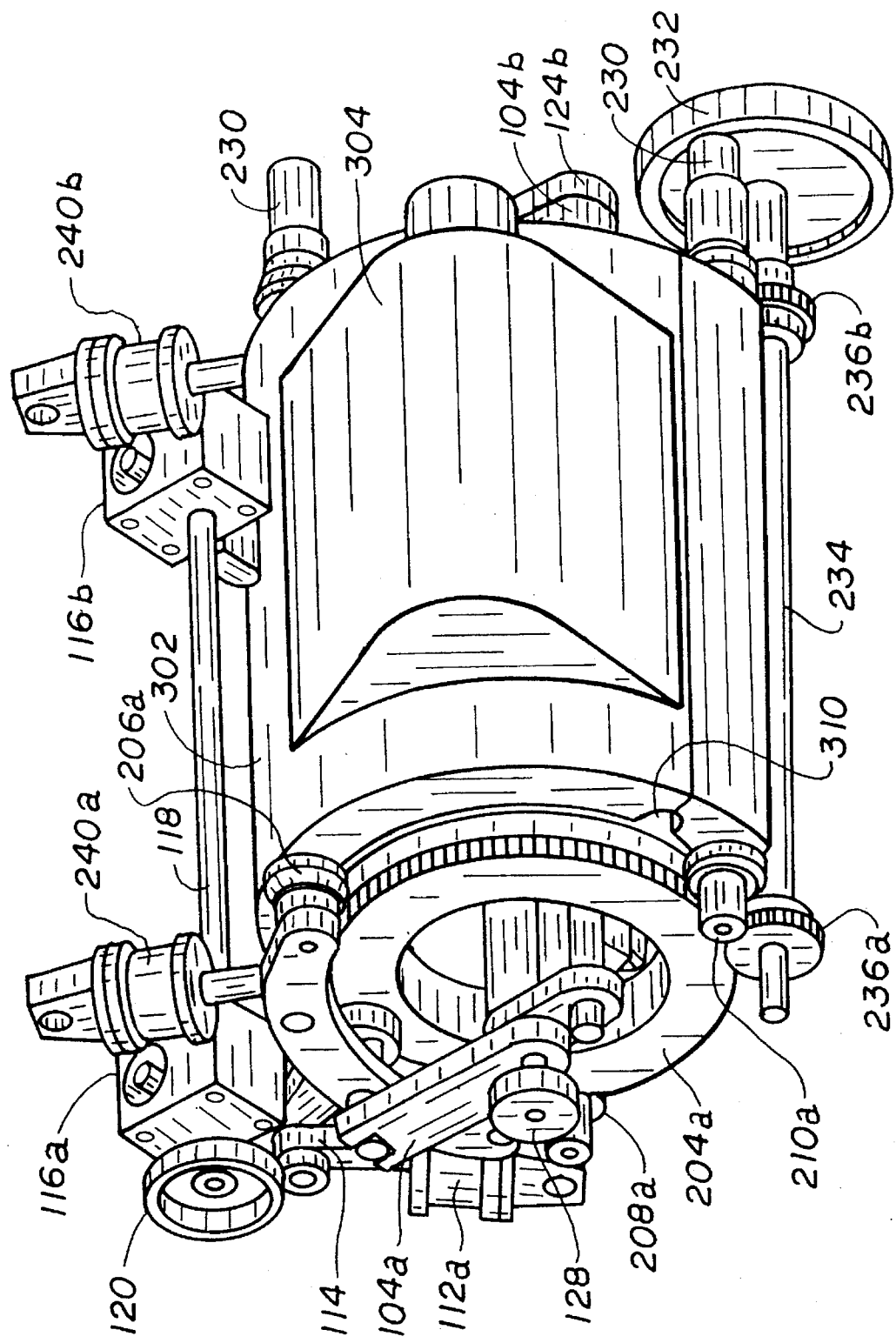
FIG. 8 is a perspective view of the die, screen and heater hood assemblies of FIGS. 3, 5 and 7, respectively, shown connected together.

FIG. 8 shows as assembled the die bracket assembly 100, the screen assembly 200 and the heater hood assembly 300. Together with the impression roll assembly 400 discussed below, these four assemblies substantially comprise the inner working mechanisms of the rotary screen coater of FIG. 2.

The Impression Roll Assembly 400

Figure 9:
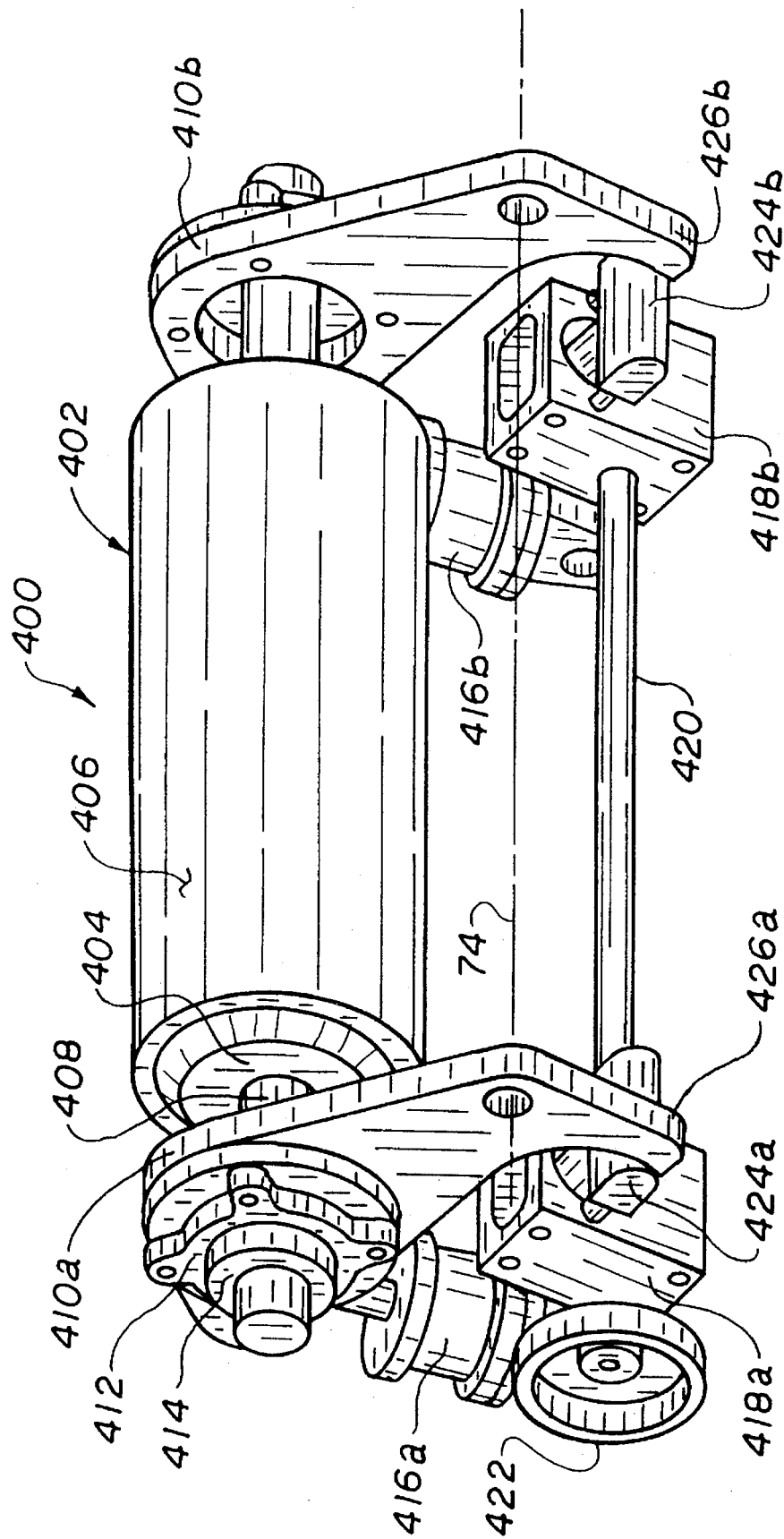
FIG. 9 is a perspective view of the impression roll assembly of the rotary screen coater of FIG. 2.

The impression roll assembly 400 is shown in FIG. 9. The impression roll 402 is used to provide a backing for the web as hot melt material is being applied to it by the die 500 through the screen 202. The impression roll 402 comprises a steel inner roll 404 with a highly polished chrome outer surface and is designed to circulate a cooling/heating fluid through its internals to maintain constant roll temperature during the process.

A shaft 408 running through the center of the impression roll 402 is mounted to both the front and rear arms 410a, 410b by means of a flange 412 and a self-aligning bearing 414. The self aligning bearing 414 assures frictionless rotation of the impression roll even if the front and rear arms 410a, 410b of the assembly are not positioned exactly parallel to each other.

The arms are mounted to front and rear frame plates 30 at the location of the idler roller 54 (FIG. 2) so that they may pivot about axis 74. Actuators 416a, 416b raise and lower the impression roll 402 into and out of position with respect to the screen 202 by pivoting the arms about axis 74. The inextensible ends of the actuators 416 are mounted to the front and rear frame plates at the same location as idler roll 48 (see FIG. 2). The extensible ends (pistons) of the actuators are mounted to the arms 410a, 410b using a clevis 118 (FIG. 2). As shown in FIG. 9, the pistons on actuators 410a, 410b are extended and the impression roll is in its raised, or coating, position (also see FIG. 10).

The impression roll assembly 400 also provides means for finely adjusting the position of the impression roll 402 at its front and rear ends with respect to the outer surface of the screen 202. These fine tuning adjustment means are similar to those described above in connection with FIG. 3 for adjusting the position of the die 500 at its front and rear ends with respect to the inner surface of the screen 202. The impression roll assembly similarly provides front and rear worm gear assemblies 418a and 418b which are connected to each other by a split coupled shaft 420. Like the actuators 416, these worm gear assemblies are fixedly attached to the front and rear frame plates 30. An adjustment wheel 422 attached to the shaft 420 extends outside of the front frame plate to actuate both the front and rear worm gear assemblies 418a, 418b. Blocks 424a and 424b extending from the worm gear assemblies are extended and retracted in response to actuation of the front and rear worm gear assemblies.

When the impression roll 402 is in its raised operating position, the actuators 416 in their extended position force the outer ends 426a, 426b of arms 410a, 410b into contact with the blocks 424a, 424b. Accordingly, by merely turning the adjustment wheel 422 to actuate both worm gear assemblies, the blocks 426 are extended or retracted, thereby minutely lowering and raising the impression roll 402, respectively.

Because the impression roll must be positioned accurately with respect to the outer surface of the screen 202 to assure uniform backing of the web, the impression roll assembly 400 provides means for independently adjusting the position of the impression roll with respect to the outer surface of the screen 202 at both the front end and the rear end of the impression roll 402. By disconnecting a split coupling (not shown in FIG. 9) in the middle of the shaft 420 which couples/uncouples front and rear halves of the shaft, the front worm gear assembly 418a may act independently of the rear worm gear assembly 418b. Accordingly, with the shaft halves coupled, the wheel 422 may be rotated to fine tune the position of the rear end of the impression roll with respect to the outer surface of the screen. Then, by decoupling the shaft halves, the front worm gear assembly 418a may be operated independently of the rear gear assembly 418b to fine tune the position of the front end of the impression roll with respect to the outer surface of the screen. In this manner, the position of the impression roll 402 may be adjusted with respect to the outer surface of the screen 202 across the entire width of the impression roll.

FIGS. 10–12 show the positional relationships of the four assemblies 100–400 described above in three conditions: the operating state (FIG. 10), the die/impression roll retracted state (FIG. 11); and the screen removal state (FIG. 12). As shown in FIG. 10, actuators 112 are extended to place the die 500 in its lowered operating position proximate the inner surface of the screen 202. Actuators 416 are extended to place the impression roll 402 is in its raised operating position proximate the outer surface of the screen 202. Actuators 240 are extended to position the heater hood 302 over the screen 202.

As shown in FIG. 11 (the die/impression roll retracted state), actuators 112 are retracted to place the die 500 in its raised standby position away from the inner surface of the screen 202. Actuators 416 are retracted to place the impression roll 402 is in its lowered standby position away from the outer surface of the screen 202. Actuators 240 remain extended to position the heater hood 302 over the screen 202. In the standby mode of operation, although it is desired that hot melt material not be forced through the screen by the die (hence the standby die position), the hot melt material must still be heated to maintain its fluidity. Thus the heater hood maintains its position over the screen.

As shown in FIG. 12 (the screen removal state), actuators 112 and 416 remain retracted to place the die and the impression roll in their standby positions away from the screen. Actuators 240, however, are now retracted to move the heater hood 302 away from their position proximate the screen. In addition, retraction of the actuators 240 pushes screen ejection rod 248 into the screen end rings. As screen eject guide rod 56 maintains a fixed position in the rotary screen coater, it serves to eject the screen from its position on the guide wheels 208, 210. Because guide wheels 206 move away from the screen along with heater hood 302 upon retraction of actuators 240, the screen 202 is now in a position to be easily and safely removed without risk of damage. As described in connection with the screen assembly 200 above, the front inner die support arm 104a must be swung away from the die and the screen about pin 148 to facilitate removal of the screen.

The Die 500

Figure 13:
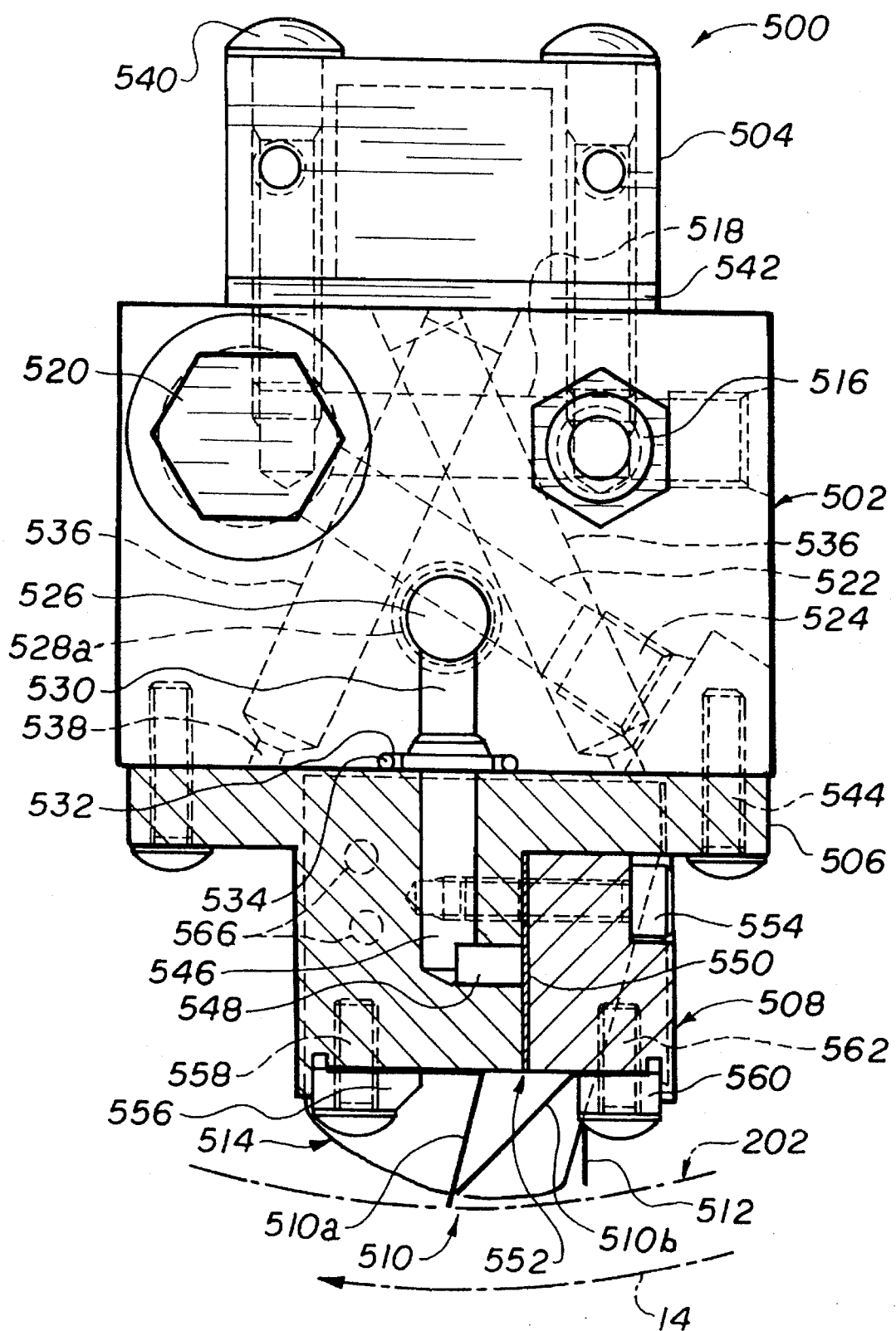
FIG. 13 is a rear view of the die of the die bracket assembly of FIG. 4.
Figure 14:
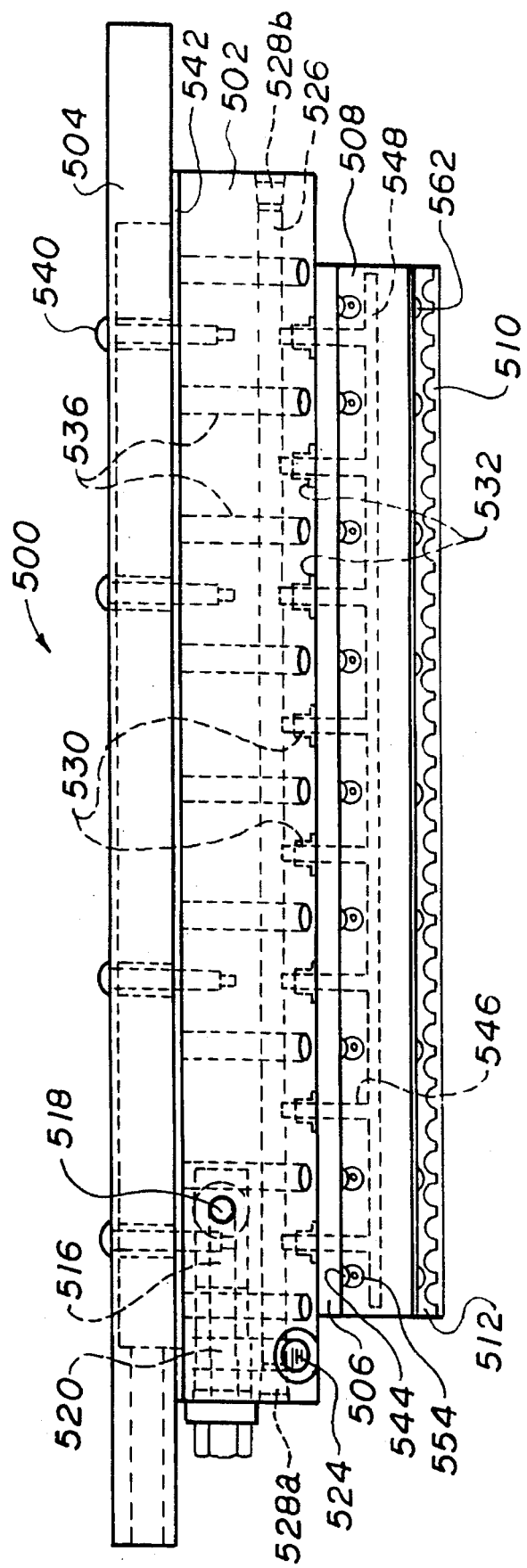
FIG. 14 is a side view of the die of FIG. 13.
Figure 15:
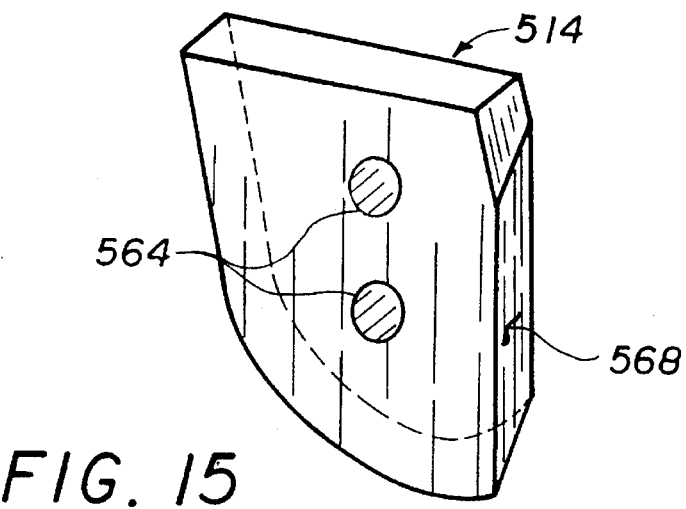
FIG. 15 is a perspective view of an end cap which forms part of the die of FIG. 13.

The die 500 is shown in more detail in FIG. 13–15. FIG. 13 shows a rear view of the die 500. The die 500 comprises a die manifold 502, an electrical wiring box 504 mounted above the manifold, and an adapter 506 mounted below the manifold. The manifold 502 and the adapter 506 form the die body. A mouthpiece 508 is attached to the bottom of the adapter 506. Connected to the bottom of the mouthpiece 508 are a two-piece wiper assembly 510 for pushing hot melt material through the screen 202, and a static agitator 512 for mixing the hot melt material. End caps 514 located on both ends of the adapter 506 funnel the hot melt material away from the end rings 204 on the screen 202 toward the middle of the screen.

The die manifold 502 provides means for introducing hot melt material therein for distribution to the mouthpiece 508 through the adapter 506. Hot melt material is introduced (pumped) through a hose fitting input 516, makes a first 90 degree turn through channel 518, and a second 90 degree turn through filter 520, which is positioned parallel to the hose fitting input. The filter prevents particulates in the hot melt material and clumps of hot melt material from clogging the die. From the filter 520, the hot melt material flows at a downward angle through channel 522. A plug 524 is placed in the end of the channel 522 to prevent hot melt material from escaping the manifold at this point.

Hot melt material flows from the angled channel 522 to a longitudinally extending distribution channel 526 running the entire cross-web width of the die from front to rear. Plugs 528a and 528b (FIG. 14) placed in the ends of the channel 526 at the front and rear ends of the manifold prevent hot melt material from escaping the manifold at these points. A plurality of manifold-to-adapter channels 530 (eight shown in FIG. 14) are provided to evenly distribute adhesive from the manifold channel 526 across the cross-web width of the adapter 506. A shoulder 532 is provided surrounding the openings of the channels 530 at the manifold-adapter interface. These openings are provided to seat O-rings 534 in the manifold-to-adapter channels 530 to prevent hot melt material from leaking at this interface.

Although not shown in FIGS. 13 or 14, plugs may be provided for select manifold-to-adapter channels 530 which are desired to be closed. Such plugs are required, for example, if the effective coating width of the die is desired to be shortened. In such a case, the channels 530 desired to be closed may be threaded for accepting a correspondingly threaded plug.

In order to insure that the hot melt material flows smoothly and consistently through the manifold, heater cartridges (not shown) are installed in cylindrical cartridge cavities 536 running from top to bottom in the manifold and spaced along the cross-web width of the die. In the embodiment shown in FIGS. 13–14, eight cartridge heaters are installed in eight corresponding cavities 536 in the manifold. The eight cavities are alternately staggered toward opposite sides of the manifold to provide even heating thereof. Plugs 538 are provided at each of the lower ends of the cartridge cavities 536.

The heater cartridges are connected to appropriate power wires in wiring box 504. The wiring box is secured to the top of the manifold 502 by threaded screws 540 and also acts as a support plate to attach the die 500 to the die bracket assembly 100. An insulator 542 is provided at the manifold-wiring box interface to isolate the wiring box and die bracket assembly 100 from the heat generated by the heater cartridges.

The adapter 506 is secured to the bottom of the manifold 502 by threaded screws 544. The adapter is provided with a plurality of channels 546 which correspond in number and position to the plurality of manifold-to-adapter channels 530. The channels 546 serve as extensions of the channels 530. Connecting the lower ends of each of the channels 546 and located at the adapter-mouthpiece interface is an adapter distribution channel 548 which runs substantially the entire cross-web width of the die. The hot melt material distribution path formed by the channels 546 and the distribution channel 548 form a series of "T-shapes" and hence the die 500 herein is referred to as a "T-slot" die.

Between the mouthpiece 508 and the adapter 506 is a shim plate 550. The distance separating the adapter and the mouthpiece, which is provided by the predetermined thickness (e.g., 0.005"–0.032") of the shim plate 550, forms a die opening 552. The die opening 552 extends substantially the entire cross-web width of the die, and provides the means by which hot melt material may be dispensed by or extruded through the die to the two-piece wiper assembly 510.

The shim plate 550 is secured between the adapter 506 and mouthpiece 508 by the same threaded screws 554 which attach the mouthpiece to the adapter. A notch (not shown) is cut into the center of the shim plate 550 from the top of the distribution channel 548 to the bottom of the adapter-mouthpiece interface substantially along the entire cross-web width of the die. The front and rear ends of the shim plate 550, however, extend the entire distance from the top to the bottom of the mouthpiece and act as a seal to prevent the hot melt material form leaking out of the front and rear ends of the die. The notch in the shim plate permits hot melt material to flow from the adapter distribution channel 548 to the die opening 552. The shim plate may be notched in a variety of manners to vary the flow path of hot melt material from the distribution channel 548 to the die opening 552.

Hot melt material flows from the die opening 552 to an area between a wiper blade 510a and a wiper blade support 510b which together make up the wiper blade assembly 510. The wiper blade assembly extends substantially the entire cross-web width of the die. Wiper blade 510a is attached to the adapter 506 by means of a retainer 556 and threaded screws 558. Wiper blade support 510b is attached to the adapter 506 by means of a retainer 560 and threaded screws 562.

As shown in FIG. 13, the direction of travel of the web to be coated is from right to left, and the rotation of screen 202 is clockwise. Accordingly, the movement of the screen and the presence of hot melt material between the blade 510a and blade support 510b opens a slight gap where the blade meets the blade support. Wiper blade 510a is resilient (e.g. a beryllium-copper alloy or spring steel having a thickness of between 0.010"–0.012"), and thereby performs a wiping action to force hot melt material through openings in the screen as they pass thereby.

The end caps 514 prevent hot melt material from accumulating at the ends of the screen 202 near the end rings 204. FIG. 15 shows a perspective view of the end cap which is attached to the rear end of the die 500 shown in FIG. 13. The end caps 514 are provided with holes 564 which align with threaded holes 566 on the front and rear of the adapter 506 through which threaded screws (not shown) are used to attach the end cap to the adapter. As shown in FIG. 13, the end caps slightly clear the inner surface of the screen to prevent damage thereto. As shown in FIG. 15, each of the end caps is provided with an angled surface 568 which serves to direct hot melt material away from the end rings 204 toward the middle of the screen.

The static agitator 512 is a right-angle shaped element having an attachment portion 512a which is attached to the bottom of retainer 560 by means of the threaded screws 562. A mixer portion 512b of the agitator 512 is designed to agitate hot melt material which typically accumulates upstream of the wiper assembly on the inner surface of the screen in the form of a long cylindrical roll extending the cross-web width of the screen. As the cylinder rolls in the direction of the screen (clockwise in FIG. 13), air impregnates the roll and forms pockets in the hot melt material. Typically, the air pockets are more concentrated near the center, as opposed to the ends, of the screen, resulting in a cylindrical roll which bulges in the center. The mixer portion 512b of the static agitator, having a downwardly extending inversely-scalloped (tined) surface as shown in FIG. 14, agitates this rotating roll to eliminate the air pockets and the bulge in the roll. Of course, surface configurations other than the inversely-scalloped surface shown in FIG. 14 are contemplated by the present invention.

The adapter 506, having attached thereto the mouthpiece 508, the wiper assembly 510 and the static agitator 512, may be installed in reverse fashion to that shown in FIG. 13. Specifically, by merely removing the screws 544, the adapter may be removed from the bottom of the manifold 502 and repositioned so that the front of the adapter is located at the rear of the manifold. In this manner, the die can handle coating of webs passing thereby in either direction.

The Control System 600

The control system 600 is designed to control the speed and position of the screen 202 in the rotary screen coater 12 described above with respect to those of the web 14. The heart of the control system is a digital controller 602 the output of which is an analog control signal which is fed to servomotor 604. The servomotor drives the screen 202 by means of timing belt 232 (refer back to FIG. 5).

The rotational position of the screen 202 in relation to the line position of the web, in combination with the pattern of openings 216 (FIG. 6) in the screen, determine the pattern of hot melt material which is applied to the web. For example, if a pattern of circular openings were provided on the screen, and the screen was rotated so that the circumferential speed of the screen matched the line speed of the web, the pattern of hot melt material applied to the web would match that on the screen. If the screen was rotated so that its circumferential speed exceeded the line speed of the web, the hot melt material would be applied to the web in a pattern of ellipses, stretched in the direction across the width of the web. Alternatively, if the screen was rotated so that its circumferential speed was less than the line speed of the web, the hot melt material would be applied to the web in a pattern of ellipses, stretched in the direction of travel of the web. In this manner, the rotary screen coater 12 provides a versatile tool for applying a predetermined pattern of hot melt material onto the surface of a web.

An operator of the rotary screen coater 12 interacts with the control system 600 by means of a menu driven controller panel 606. The operator enters numerical values representing the fixed system parameters such as the number of patterns on the screen, the number of patterns desired to be applied between I-marks on the border of the web to be coated, and a best estimate of the distance between I-marks on the web. Given this information, computational means within the controller panel calculates a setpoint representing the ratio of screen circumferential speed to web line speed. For example, in a simple case, if the circumference of the screen matched the distance between I-marks, and the number of patterns desired on the web between the I-marks matched the number on the screen, the computational means would arrive at a setpoint ratio of 1.000. This initial setpoint is stored in memory by the controller 602.

The calculated setpoint ratio is input to the controller 602 via a standard industrial programmable logic controller (PLC) 608 which also manages all secondary discrete and analog control signals in the system 600. The controller 602 uses this setpoint ratio to control the position of the screen 202 with respect to that of the web, based on screen positional feedback received from the servomotor 604 via screen encoder 610, and web positional feedback received from line encoder 612. The encoders 610, 612 are quadrature encoders which provide a digital signal representing speed, position and direction of the screen and web, respectively.

The screen encoder 610 is mounted directly to the servomotor 604. Because servomotor is directly linked to the screen 202 via timing belt 232 and drive gears 236 (FIG. 5), screen encoder 610 provides a feedback signal representing the exact position of the screen. The line encoder 612 is linked to the silicon rubber idler roll 50 to provide an accurate reference signal representing the position of the web. The output of each of the encoders is a digital pulse waveform.

The controller 602 uses the output of the line encoder 612 as a reference signal, and the output of the screen encoder 610 as a feedback signal, to provide closed loop control of the servomotor 604 to the calculated position setpoint ratio input to the controller. This inner position loop of control circuit 600 is represented as reference numeral 614 in FIG. 16. The inner position loop 614 controls the position of the screen with respect to that of the web being coated during constant operation of the rotary screen coater.

In addition to the inner position loop 614, an outer position loop 616 of control circuit 600 accounts for any positional error of the web with respect to the screen which may creep into the system over the course of its operation, and which may not be accounted for by the web position indicated by the line encoder 612. The outer position loop 616 includes a photo eye 618 and a counter/co-processor 620. The photo eye is mounted within the screen coater near the screen 202 to detect the I-marks on the passing web and provide a digital output in response to this detection.

The counter/co-processor receives as inputs the calculated position setpoint ratio input into the controller, the output of line encoder 612, and the digital output of the photo eye 618. The counter/co-processor counts the number of encoder pulses received by the line encoder and is reset each time the photo eye detects an I-mark.

As explained above, the initial setpoint ratio is determined in part by the best estimate of distance between I-marks entered by an operator. The counter/co-processor takes the number of line encoder pulses received between I-marks and converts this to a numerical value representing the actual distance between I-marks as detected on the web. This value is then used to recalculate the setpoint ratio to correct for any error in the estimation of the initially entered distance between I-marks or changes in web or printing characteristics. The recalculated setpoint ratio is compared with the most recent setpoint ratio (the initial setpoint ratio on start-up) to arrive at a setpoint ratio correction value. The correction value is fed to the inner position loop 614 which controls the position of the screen servomotor to this corrected setpoint ratio.

Figure 17:
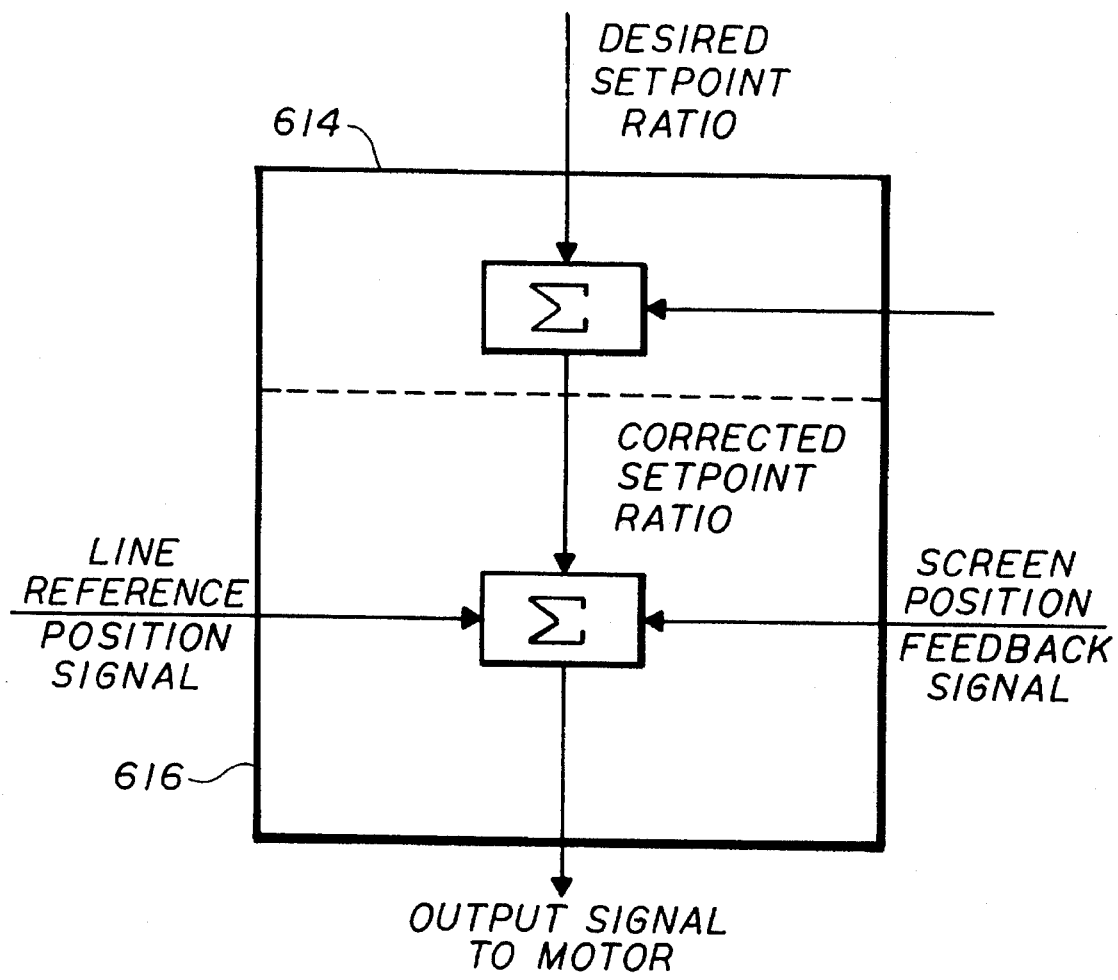
FIGS. 16–17 are schematic diagrams of an electrical control circuit for controlling the operation of the rotary screen coater of FIG. 2.

The setpoint ratio recalculation is performed upon the detection of each successive I-mark by the photo eye 618. Such rapid recalculation is attainable because the scan time of the outer position loop is faster than that of the inner position loop. The output of the outer position loop 616 is therefore a setpoint ratio delta which is repeatedly fed to the inner position loop 614 to dynamically correct the setpoint ratio in real time As shown in FIG. 17, this inner-outer loop configuration provides a control system which is self-correcting in terms of constantly providing a more accurate determination of the setpoint ratio to which the controller controls. The inner position loop 616 can thereby maintain more accurate control of the servomotor 604 to a setpoint ratio which is modified in real time from the calculated position setpoint ratio initially input to the controller. Absent the outer position loop 616, the inner position loop 614 would control the servomotor to a fixed setpoint ratio which might not represent the true operating parameters of the system 10. In addition, by controlling the motor position to a setpoint ratio which is recalculated upon detection of each I-mark, the control circuit 600 is able to hold position through starting and stopping operations.

Accordingly, the preferred embodiment of an electrical control circuit, for controlling the position, speed and direction of a rotary screen coater with respect to the line position, speed and direction of a moving web, has been described. With the foregoing description in mind, however, it is understood that this description is made only by way of example, that the invention is not limited to the particular embodiments described herein. For example, the inventive electrical control circuit may be used outside of the rotary screen coater applications, for example, on any application involving the synchronization of a rotary coating process with respect to a moving web which is to be coated. Therefore, it is to be understood that various rearrangements, modifications and substitutions may be implemented with respect to the foregoing description without departing from the scope of the invention as defined by the following claims and their equivalents.

We claim:

1. A hot melt material coating system (10), comprising:
   a rotary coater (12) driven by a motor (604);
   a rotary coater speed and direction indicator (610) operatively connected to said rotary coater and providing a signal representing the speed and direction thereof;
   a web speed and direction indicator (612) operatively connected to said web and providing a signal representing the speed and direction thereof;
   a first control circuit (614), connected to said rotary coater speed and direction indicator (610) and to said web speed and direction indicator (612), for receiving said rotary coater speed and direction indicator signal and said web speed and direction indicator signal, and for outputting a control signal to said motor in response to said indicator signals to maintain a predetermined relationship of the speed and direction of said rotary coater with respect to that of said web;
   a web position indicator (618) positioned proximate to the web and providing a signal representing the position thereof; and
   a second control circuit (616), connected to said web position indicator (618) and to said web speed and direction indicator (612), for receiving said web position indicator signal and said web speed and direction indicator signal, and for outputting a web position correction signal to said first control circuit, said first control circuit varying said control signal in response to said web position correction signal.

2. The hot melt material coating system of claim 1, further comprising an input mechanism (606), connected to said first control circuit, for inputting to said first control circuit a setpoint value representing an initially calculated ratio of rotary coater speed and direction to web speed and direction, said input mechanism providing memory for transferring said setpoint value to said first control circuit, and wherein said first control circuit initially outputs said control signal in response to said transferred setpoint value.

3. The hot melt material coating system of claim 2, wherein said correction signal represents a setpoint value deviation.

4. The hot melt material coating system of claim 2, wherein said input mechanism (606) comprises computational means for computing said setpoint value based on information related to fixed system parameters.

5. The hot melt material coating system of claim 2, wherein said rotary coater is a rotary screen coater and said hot melt material is a meltable adhesive material.

6. The hot melt material coating system of claim 3, wherein said rotary coater speed and direction indicator (610) and said web speed and direction indicator (612) are digital quadrature encoders.

7. The hot melt material coating system of claim 3, wherein said setpoint value is a numerical value and said correction signal is a numerical deviation from said numerical value.

8. The hot melt material coating system of claim 3, wherein said web position indicator is a photosensor (618) for sensing defined positions on the web.

9. The hot melt material coating system of claim 8, wherein said second control circuit includes a counter (620) for counting digital pulses output by said web speed and direction indicator, said counter being reset upon detection of successive defined positions on the web by said photosensor, and a co-processor (620) for recalculating said setpoint value deviation upon the occurrence of each of said detections.

10. A control system (600) for controlling the speed, position and direction of a rotary coating machine driven by a slave motor with respect to a web to be coated which is passing in close proximity by said rotary coating machine and which is supported by a web transport mechanism, said control system comprising:
    a rotary coating machine speed and direction indicator (610) operatively connected to the rotary coating machine and providing a slave signal representing the speed and direction thereof;
    a web speed and direction indicator (612) operatively connected to said web and providing a master signal representing the speed and direction thereof;
    a first control circuit (614), connected to said rotary coater speed and direction indicator (610) and to said web speed and direction indicator (612), for receiving said master speed and direction signal and said slave speed and direction signal, and for outputting a control signal to the slave motor in response to said master and slave speed and direction signals to maintain a predetermined relationship of the speed and direction of said rotary coating machine with respect to that of said web;
    a web position indicator (618) positioned proximate to the web and providing a signal representing the position thereof with respect to said web; and
    a second control circuit (616), connected to said web position indicator (618) and to said web speed and direction indicator (612), for receiving said web position indicator signal and said master speed and direction signal, and for outputting a web position correction signal to said first control circuit, said first control circuit varying said control signal in response to said web position correction signal.

11. The control system of claim 10, further comprising an input mechanism (606), connected to said first control circuit, for inputting to said first control circuit a setpoint value representing an initially calculated ratio of rotary coating machine speed and direction to web speed and direction, said input mechanism providing memory for transferring said setpoint value to said first control circuit, and wherein said first control circuit initially outputs said control signal in response to said transferred setpoint value.

12. The control system of claim 11, wherein said correction signal represents a setpoint value deviation.

13. The control system of claim 11, wherein said input mechanism (606) comprises computational means for computing said setpoint value based on information related to fixed system parameters.

14. The control system of claim 12, wherein said rotary coating machine speed and direction indicator (610) and said web speed and direction indicator (612) are digital quadrature encoders.

15. The control system of claim 12, wherein said setpoint value is a numerical value and said correction signal is a numerical deviation from said numerical value.

16. The control system of claim 12, wherein said web position indicator is a photosensor (618) for sensing defined positions on the web.

17. The control system of claim 16, wherein said second control circuit includes a counter (620) for counting digital pulses output by said web speed and direction indicator, said counter being reset upon detection of successive defined positions on the web by said photosensor, and a co-processor (620) for recalculating said setpoint value deviation upon the occurrence of each of said detections.

\* \* \* \* \*